(12) United States Patent
Bachrach et al.

(10) Patent No.: US 12,007,763 B2
(45) Date of Patent: *Jun. 11, 2024

(54) MAGIC WAND INTERFACE AND OTHER USER INTERACTION PARADIGMS FOR A FLYING DIGITAL ASSISTANT

(71) Applicant: Skydio, Inc., Redwood City, CA (US)

(72) Inventors: Abraham Bachrach, Emerald Hills, CA (US); Adam Bry, Redwood City, CA (US); Matthew Donahoe, Redwood City, CA (US)

(73) Assignee: Skydio, Inc., San Mateo, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,122

(22) Filed: Jan. 31, 2023

(65) Prior Publication Data

US 2023/0280742 A1    Sep. 7, 2023

Related U.S. Application Data

(63) Continuation of application No. 17/077,565, filed on Oct. 22, 2020, now Pat. No. 11,573,562, which is a
(Continued)

(51) Int. Cl.
*G05D 1/00* (2006.01)
*B64C 39/02* (2023.01)
(Continued)

(52) U.S. Cl.
CPC ......... *G05D 1/0016* (2013.01); *B64C 39/024* (2013.01); *B64D 47/08* (2013.01);
(Continued)

(58) Field of Classification Search
CPC .. G05D 1/0016; G05D 1/0027; G05D 1/0044; G05D 1/0094; B64C 39/024;
(Continued)

(56) References Cited

U.S. PATENT DOCUMENTS 5,211,172 A    5/1993   McGuane et al.
6,744,397 B1   6/2004   Hager et al.
(Continued)

FOREIGN PATENT DOCUMENTS

AU    2010219335 A1    9/2010
WO    2015/105886 A1   7/2015
WO    2016/086379 A1   6/2016

OTHER PUBLICATIONS

Aguiar, Antonio Pedro et al., "Logic-Based Switching Control for Trajectory-Tracking and Path-Following of Underactuated Autonomous Vehicles With Parametric Modeling Uncertainty," Proceeding of the 2004 American Control Conference, pp. 3004-3010, Jun. 30-Jul. 2, 2004.
(Continued)

*Primary Examiner* — Russell Frejd

(57) ABSTRACT

Methods and systems are described for new paradigms for user interaction with an unmanned aerial vehicle (referred to as a flying digital assistant or FDA) using a portable multifunction device (PMD) such as smart phone. In some embodiments, a magic wand user interaction paradigm is described for intuitive control of an FDA using a PMD. In other embodiments, methods for scripting a shot are described.

20 Claims, 25 Drawing Sheets

Related U.S. Application Data continuation of application No. 15/894,260, filed on Feb. 12, 2018, now Pat. No. 10,816,967, which is a continuation of application No. 15/591,883, filed on May 10, 2017, now Pat. No. 9,891,621, which is a continuation of application No. 14/688,998, filed on Apr. 16, 2015, now Pat. No. 9,678,506.

(60) Provisional application No. 62/014,650, filed on Jun. 19, 2014.

(51) Int. Cl.
  *B64D 47/08* (2006.01)
  *B64U 10/10* (2023.01)
  *B64U 10/13* (2023.01)
  *B64U 30/20* (2023.01)
  *B64U 101/30* (2023.01)
  *G01C 21/16* (2006.01)
  *G01C 23/00* (2006.01)

(52) U.S. Cl.
  CPC ......... *G01C 21/1656* (2020.08); *G01C 23/00* (2013.01); *G05D 1/0027* (2013.01); *G05D 1/0044* (2013.01); *G05D 1/0094* (2013.01); *B64U 10/10* (2023.01); *B64U 10/13* (2023.01); *B64U 30/20* (2023.01); *B64U 2101/30* (2023.01); *B64U 2201/10* (2023.01); *B64U 2201/20* (2023.01)

(58) Field of Classification Search
  CPC .... B64D 47/08; G01C 21/1656; G01C 23/00; B64U 10/10; B64U 10/13; B64U 30/20; B64U 2101/30; B64U 2201/10; B64U 2201/20
  See application file for complete search history.

(56) References Cited

U.S. PATENT DOCUMENTS

| | | |
|---|---|---|
| 7,363,157 B1 | 4/2008 | Hanna et al. |
| 7,773,116 B1 | 8/2010 | Stevens |
| 8,031,175 B2 | 10/2011 | Rigazio et al. |
| 8,043,513 B2 | 10/2011 | Milanovic et al. |
| 8,301,326 B2 | 10/2012 | Malecki et al. |
| 8,712,679 B1 | 4/2014 | Mostofi et al. |
| 8,958,928 B2 | 2/2015 | Seydoux et al. |
| 9,132,913 B1 | 9/2015 | Shapiro et al. |
| 9,243,916 B2 | 1/2016 | Roumeliotis et al. |
| 9,454,154 B1 | 9/2016 | Safarik |
| 9,534,917 B2 | 1/2017 | Abuelsaad et al. |
| 9,588,516 B1 | 3/2017 | Gurel et al. |
| 9,609,288 B1 | 3/2017 | Richman et al. |
| 9,678,506 B2 | 6/2017 | Bachrach et al. |
| 9,690,289 B2 | 6/2017 | Yang et al. |
| 9,739,870 B1 | 8/2017 | Beckman et al. |
| 9,753,460 B1 | 9/2017 | Safarik |
| 9,766,074 B2 | 9/2017 | Roumeliotis et al. |
| 9,798,322 B2 | 10/2017 | Bachrach et al. |
| 9,891,621 B2 | 2/2018 | Bachrach et al. |
| 9,930,298 B2 | 3/2018 | Bevirt |
| 9,972,212 B1 | 5/2018 | Sperindeo et al. |
| 10,007,265 B1 | 6/2018 | Larsen |
| 10,033,980 B2 | 7/2018 | Boyd et al. |
| 10,182,225 B1 | 1/2019 | Cui et al. |
| 2007/0078573 A1 | 4/2007 | Ivansson et al. |
| 2007/0106473 A1 | 5/2007 | Bodin et al. |
| 2008/0033604 A1 | 2/2008 | Margolin |
| 2008/0267451 A1 | 10/2008 | Karazi |
| 2009/0125223 A1 | 5/2009 | Higgins |
| 2009/0157233 A1 | 6/2009 | Kokkeby et al. |
| 2009/0228205 A1 | 9/2009 | Ariyur et al. |
| 2010/0013860 A1 | 1/2010 | Mandella et al. |
| 2010/0084513 A1 | 4/2010 | Gariepy et al. |
| 2010/0157055 A1 | 6/2010 | Pechatnikov |
| 2010/0191391 A1 | 7/2010 | Zeng |
| 2010/0198514 A1 | 8/2010 | Miralles |
| 2010/0228414 A1 | 9/2010 | Scheu |
| 2010/0250032 A1 | 9/2010 | Gremmert |
| 2010/0277587 A1 | 11/2010 | Pechatnikov et al. |
| 2010/0305778 A1 | 12/2010 | Dorneich et al. |
| 2011/0044498 A1 | 2/2011 | Cobb et al. |
| 2011/0090399 A1 | 4/2011 | Whitaker et al. |
| 2011/0147515 A1 | 6/2011 | Miller et al. |
| 2011/0311099 A1 | 12/2011 | Derbanne |
| 2012/0114229 A1 | 5/2012 | Zhou |
| 2012/0148162 A1 | 6/2012 | Zhang et al. |
| 2012/0212406 A1 | 8/2012 | Osterhout et al. |
| 2012/0236030 A1 | 9/2012 | Border et al. |
| 2013/0030875 A1 | 1/2013 | Lee et al. |
| 2013/0127980 A1 | 5/2013 | Haddick et al. |
| 2013/0271579 A1 | 10/2013 | Wang |
| 2013/0278631 A1 | 10/2013 | Border et al. |
| 2013/0317667 A1 | 11/2013 | Kruglick |
| 2014/0019352 A1 | 1/2014 | Shrivastava |
| 2014/0035736 A1 | 2/2014 | Weddle et al. |
| 2014/0043436 A1 | 2/2014 | Bell et al. |
| 2014/0067160 A1 | 3/2014 | Levien et al. |
| 2014/0168461 A1 | 6/2014 | Dani et al. |
| 2014/0226024 A1 | 8/2014 | Limbaugh et al. |
| 2014/0267777 A1 | 9/2014 | Le Clerc et al. |
| 2014/0270743 A1 | 9/2014 | Webb et al. |
| 2014/0306866 A1 | 10/2014 | Miller et al. |
| 2014/0316616 A1 | 10/2014 | Kugelmass |
| 2014/0316698 A1 | 10/2014 | Roumeliotis et al. |
| 2014/0324253 A1 | 10/2014 | Duggan et al. |
| 2014/0327770 A1 | 11/2014 | Wagreich |
| 2014/0336928 A1 | 11/2014 | Scott |
| 2014/0371952 A1 | 12/2014 | Ohtomo et al. |
| 2015/0022640 A1 | 1/2015 | Metzler et al. |
| 2015/0027044 A1 | 1/2015 | Redden |
| 2015/0062339 A1 | 3/2015 | Ostrom |
| 2015/0153436 A1 | 6/2015 | Benson |
| 2015/0158587 A1 | 6/2015 | Patrick et al. |
| 2015/0160658 A1 | 6/2015 | Reedman et al. |
| 2015/0201180 A1 | 7/2015 | Mourikis et al. |
| 2015/0230150 A1 | 8/2015 | Wang et al. |
| 2015/0242972 A1 | 8/2015 | Lemmey et al. |
| 2015/0259078 A1 | 9/2015 | Filipovic et al. |
| 2015/0310603 A1 | 10/2015 | Moraites et al. |
| 2015/0312774 A1 | 10/2015 | Lau |
| 2015/0341540 A1 | 11/2015 | Kim et al. |
| 2015/0346915 A1 | 12/2015 | Kondekar et al. |
| 2015/0370250 A1 | 12/2015 | Bachrach et al. |
| 2016/0018822 A1 | 1/2016 | Nevdahs et al. |
| 2016/0041266 A1 | 2/2016 | Smits |
| 2016/0050840 A1 | 2/2016 | Sauder et al. |
| 2016/0054737 A1 | 2/2016 | Soll et al. |
| 2016/0068267 A1 | 3/2016 | Liu et al. |
| 2016/0070265 A1 | 3/2016 | Liu et al. |
| 2016/0122038 A1 | 5/2016 | Fleischman et al. |
| 2016/0129999 A1 | 5/2016 | Mays |
| 2016/0139596 A1 | 5/2016 | Na et al. |
| 2016/0140729 A1 | 5/2016 | Soatto et al. |
| 2016/0144943 A1 | 5/2016 | Cheng et al. |
| 2016/0232423 A1 | 8/2016 | Zhong et al. |
| 2016/0267325 A1 | 9/2016 | Sundaresan et al. |
| 2016/0280397 A1 | 9/2016 | Christ et al. |
| 2016/0299504 A1 | 10/2016 | Hsiao |
| 2016/0304198 A1 | 10/2016 | Jourdan |
| 2016/0327950 A1 | 11/2016 | Bachrach et al. |
| 2016/0344981 A1 | 11/2016 | Lunt |
| 2017/0008521 A1 | 1/2017 | Braunstein et al. |
| 2017/0010623 A1 | 1/2017 | Tang et al. |
| 2017/0023937 A1 | 1/2017 | Loianno et al. |
| 2017/0024877 A1 | 1/2017 | Versace et al. |
| 2017/0066135 A1 | 3/2017 | Cohen et al. |
| 2017/0116776 A1 | 4/2017 | Aughey |
| 2017/0180729 A1 | 6/2017 | Wu |
| 2017/0180754 A1 | 6/2017 | Wu et al. |
| 2017/0192418 A1 | 7/2017 | Bethke et al. |
| 2017/0201714 A1 | 7/2017 | Kim et al. |
| 2017/0210486 A1 | 7/2017 | O'Brien et al. |

(56) References Cited

U.S. PATENT DOCUMENTS

| | | |
|---|---|---|
| 2017/0219347 A1 | 8/2017 | Veto |
| 2017/0227656 A1 | 8/2017 | Niesen et al. |
| 2017/0278014 A1 | 9/2017 | Lessmann et al. |
| 2017/0294010 A1 | 10/2017 | Shen et al. |
| 2017/0301109 A1 | 10/2017 | Chan et al. |
| 2017/0305546 A1 | 10/2017 | Ni et al. |
| 2017/0313416 A1 | 11/2017 | Mishra et al. |
| 2017/0313441 A1 | 11/2017 | Tsai |
| 2017/0314926 A1 | 11/2017 | Royster et al. |
| 2017/0314927 A1 | 11/2017 | Royster et al. |
| 2017/0329324 A1 | 11/2017 | Bachrach et al. |
| 2017/0341776 A1 | 11/2017 | McClure et al. |
| 2017/0351933 A1 | 12/2017 | Bleiweiss |
| 2017/0357858 A1 | 12/2017 | Mendonca et al. |
| 2017/0359515 A1 | 12/2017 | Harris et al. |
| 2017/0359943 A1 | 12/2017 | Calleija et al. |
| 2018/0046187 A1 | 2/2018 | Martirosyan et al. |
| 2018/0074524 A1 | 3/2018 | Yamasaki |
| 2018/0095459 A1 | 4/2018 | Bachrach et al. |
| 2018/0129278 A1 | 5/2018 | Luchinskiy |
| 2018/0201272 A1 | 7/2018 | Takeda |
| 2018/0246507 A1 | 8/2018 | Bachrach et al. |
| 2019/0011921 A1 | 1/2019 | Wang et al. |
| 2019/0027036 A1 | 1/2019 | Mishina et al. |
| 2019/0035278 A1 | 1/2019 | Mishina et al. |
| 2019/0149735 A1 | 5/2019 | Harris et al. |
| 2019/0204824 A1 | 7/2019 | Micros |

OTHER PUBLICATIONS

Ataei, Mansour et al., "Three-Dimensional Optimal Path Planning for Waypoint Guidance of an Autonomous Underwater Vehicle," Robotics and Autonomous Systems, vol. 67, pp. 23-32, 2015, available online Oct. 24, 2014.

Brake, Nicholas J., Master's Thesis for "Control System Development for Small UAV Gimbal," 113 pages, Aug. 2012.

Gu, Feng et al., "Active Persistent Localization of a Three-Dimensional Moving Target Under Set-Membership Uncertainty Description Through Cooperation of Multiple Mobile Robots," IEEE Transactions on Industrial Electronics, vol. 62, No. 8, pp. 4958-4971, Aug. 2015, initial publication Feb. 19, 2015.

Horenstein, Henry, "Black & White Photography—A Basic Manual," Third Revised Edition, Chapter 6, p. 94, 2005.

International Application No. PCT/US2016/027921, International Search Report, Written Opinion, 12 pages, dated Jul. 15, 2016.

Kakvand, P. et al., "Smart On-Board UAV System: Using Computer Vision System to Find a Movable and Stationary Target," IEEE, pp. 694-699, 2015.

Kalnins, L. M., "Coordinate Systems," 5 pages, Mar. 2009.

Kaminer, Isaac et al., "Trajectory Tracking for Autonomous Vehicles: An Integrated Approach to Guidance and Control," Journal of Guidance, Control, and Dynamics, vol. 21, No. 1, pp. 29-38, Jan.-Feb. 1998.

Kim, Seungkeun et al., "Three Dimensional Optimum Controller for Multiple UAV Formation Flight Using Behavior-Based Decentralized Approach," International Conference on Control, Automation and Systems, pp. 1387-1392, Oct. 17-20, 2007.

Mansfield, Katrina et al., "Unmanned Aerial Vehicle Smart Device Ground Control Station Cyber Security Threat Model," IEEE, pp. 722-728, 2013.

O'Reilly, O. M., "Engineering Dynamics: A Primer," Chapter 2, pp. 17-25, 2010.

Quigley, Morgan et al., "Target Acquisition, Localization, and Surveillance Using a Fixed-Wing Mini-UAV and Gimbaled Camera," IEEE, pp. 2600-2605, 2005.

Santana, Lucas Vago et al., "Outdoor Waypoint Navigation With the AR.Drone Quadrotor," IEEE, pp. 303-311, 2015.

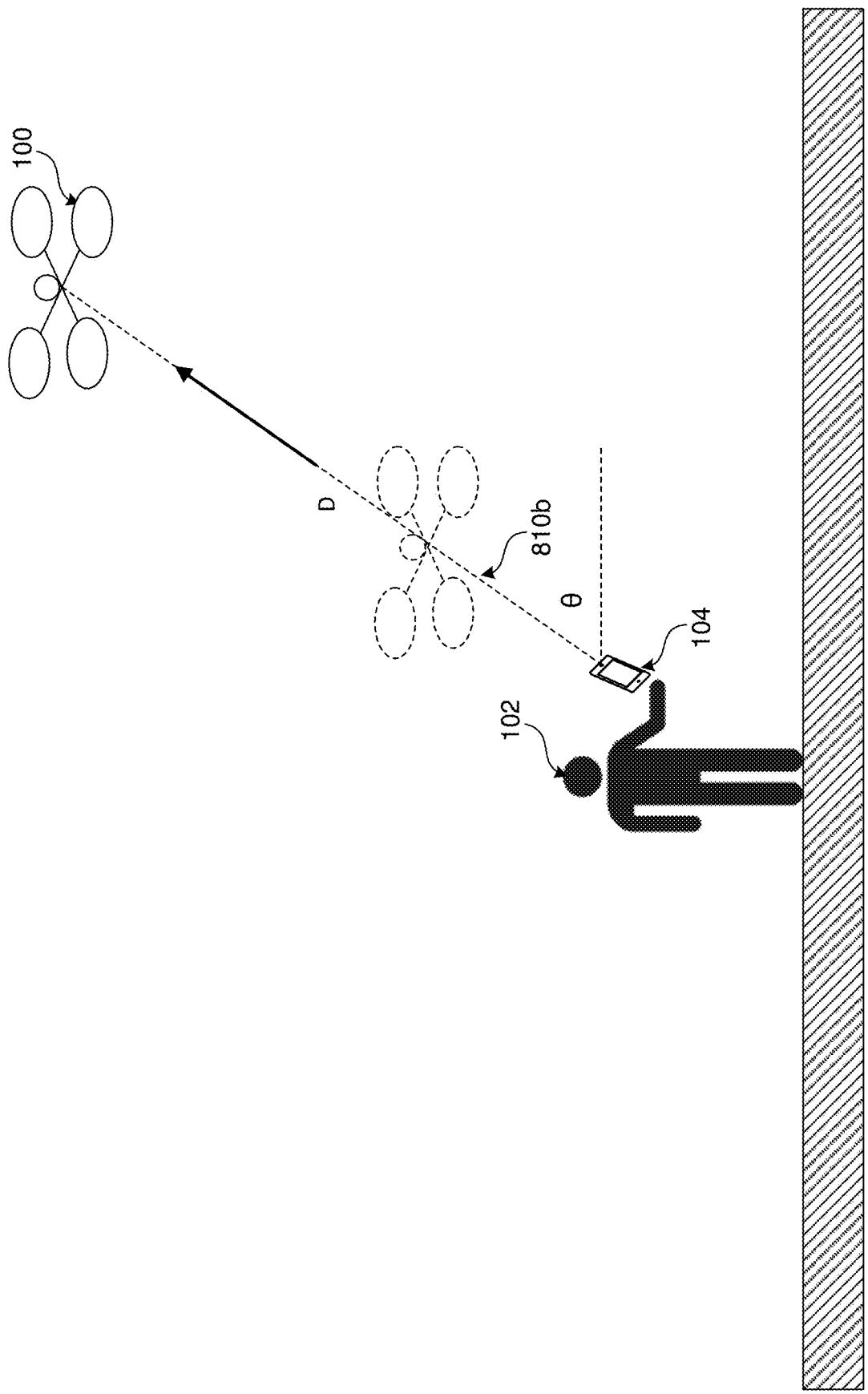

… (1) …

MAGIC WAND INTERFACE AND OTHER USER INTERACTION PARADIGMS FOR A FLYING DIGITAL ASSISTANT

CROSS-REFERENCE TO RELATED APPLICATION(S)

This application is a continuation of U.S. patent application Ser. No. 17/077,565, entitled "MAGIC WAND INTERFACE AND OTHER USER INTERACTION PARADIGMS FOR A FLYING DIGITAL ASSISTANT," filed Oct. 22, 2020, now issued as U.S. Pat. No. 11,573,562; which is a continuation of U.S. patent application Ser. No. 15/894,260, entitled "MAGIC WAND INTERFACE AND OTHER USER INTERACTION PARADIGMS FOR A FLYING DIGITAL ASSISTANT," filed Feb. 12, 2018, now issued as U.S. Pat. No. 10,816,967; which is continuation of U.S. patent application Ser. No. 15/591,883, entitled "CONTROL OF AN UNMANNED AERIAL VEHICLE THROUGH MULTI-TOUCH INTERACTIVE VISUALIZATION," filed May 10, 2017, now issued as U.S. Pat. No. 9,891,621; which is a continuation of U.S. patent application Ser. No. 14/688,998, entitled "MAGIC WAND INTERFACE AND OTHER USER INTERACTION PARADIGMS FOR A FLYING DIGITAL ASSISTANT," filed Apr. 16, 2015, now issued as U.S. Pat. No. 9,678,506; which is entitled to the benefit of and/or the right of priority to U.S. Provisional Patent Application No. 62/014,650, entitled "METHODS AND SYSTEMS FOR A FLYING DIGITAL ASSISTANT, filed Jun. 19, 2014, all of which are hereby incorporated by reference in their entirety for all purposes.

TECHNICAL FIELD

The present disclosure relates generally to methods and systems for the control of unmanned aerial vehicles (UAV) as platforms for the capture of images and video. Specifically, the present disclosure relates to new paradigms for user interaction with and control of UAVs using a portable multifunction device, for example, such as smart phone.

BACKGROUND

Unmanned aerial vehicles (UAV) are increasingly being used as platforms for taking images (including video) from the air. A number of UAV systems are currently available that provide for image and video capture and remote control from a device on the ground. However, currently available systems require piloting using direct control of the UAV similar to other fixed wing or rotor craft. In other words control by directly adjusting the pitch, roll, yaw, and power of the UAV, for example using common control inputs such as a joystick and throttle control. While effective to a degree, such control systems require expertise on the part of the remote pilot and are prone to crashes caused by pilot error. Instead, methods and systems are needed that provide for indirect control of an otherwise autonomous UAV using new intuitive and user-friendly paradigms for interaction.

BRIEF DESCRIPTION OF THE DRAWINGS

FIGS. 8A-8C illustrate example processes for controlling an FDA using a magic wand user interaction paradigm, according to some embodiments.

DETAILED DESCRIPTION

Flying Digital Assistant—Overview

Figure 1:
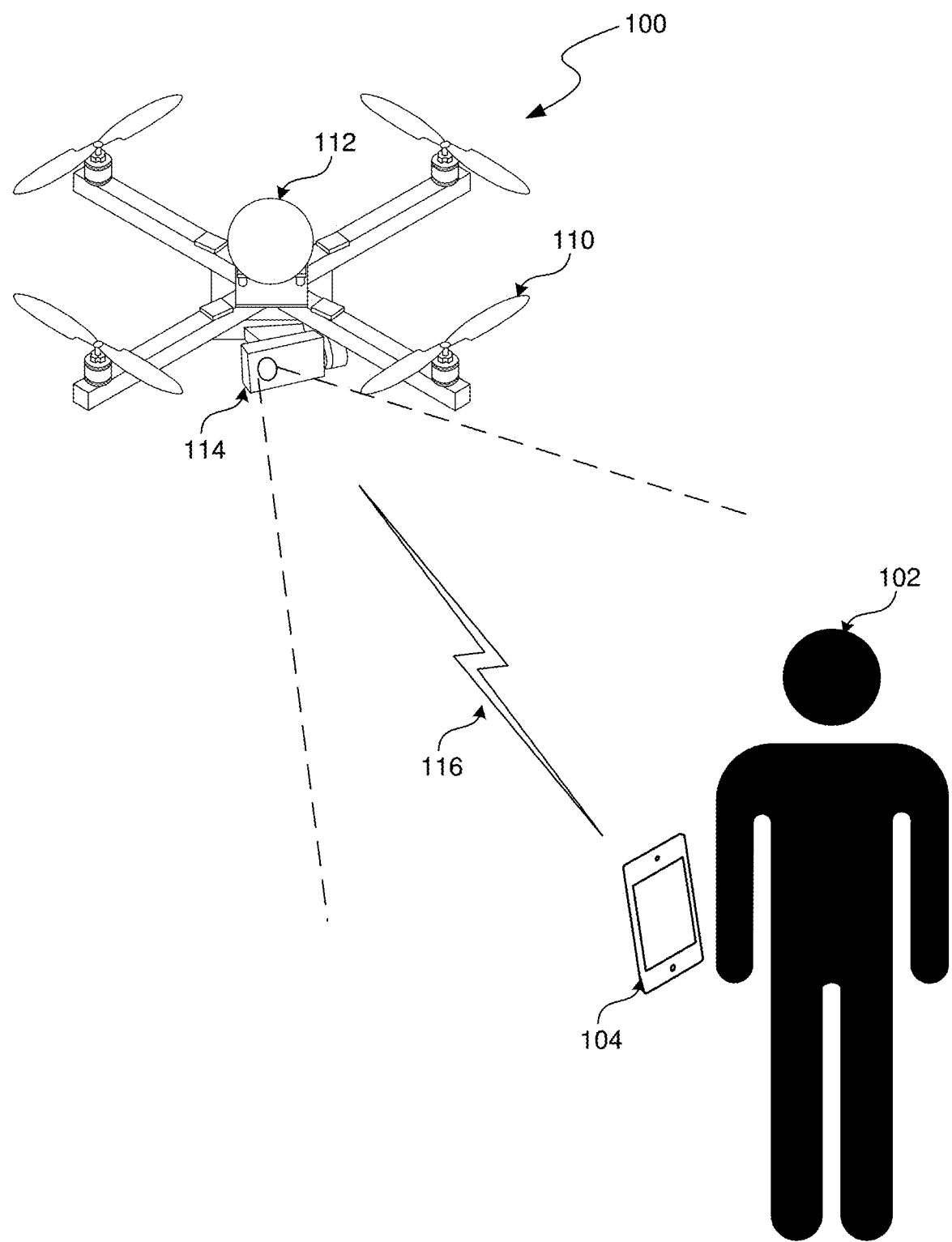
FIG. 1 is illustration of an example Flying Digital Assistant ("FDA") controlled by a user via a portable multifunction device (PMD), according to some embodiments.

FIG. 1 is an illustration of a Flying Digital Assistant ("FDA") 100 controlled by a user 102 via a portable multifunction device ("PMD") 104, according to some embodiments. As shown in FIG. 1, an FDA 100 may comprise a quadcopter "unmanned aerial vehicle" (UAV) or "drone." In this specification, terms such as "FDA," "UAV," "quadcopter," and "drone" may be used interchangeably. The FDA 100 as shown in FIG. 1 may include propulsion and control surfaces 110 (e.g., powered rotors) for maintaining controlled flight, sensors for automated navigation and flight control 112 (e.g., an omni-directional camera ball—described in more detail herein), sensors 114 for capturing images (including video), and audio (e.g., a camera and microphone), and means (not shown) for communicating with the PMD 104, for example via a wireless connection 116.

The FDA 100 shown in FIG. 1 is an example embodiment, an FDA in accordance with the present teachings may include more or fewer components. Examples of an FDA and PMD are described in more detail in later sections. Various embodiments of the present teachings allow a user 102 to control the capture of audio, images, and/or video through the use of an FDA 100 and a PMD 104. Along with control inputs from a user 102 transmitted via the PMD 104, the FDA 100 may travel autonomously to capture audio, images, and/or video. The FDA 100 may generally be conceptualized as an autonomous aerial camera rather than as a vehicle with an attached camera, and may therefor represent a paradigm shift in which cameras are understood. As will be described in more detail, an FDA similar to FDA 100 in FIG. 1 and/or as described with reference to FIG. 13, may allow for a number of new user interaction paradigms. For example, a "magic wand" interface in which an FDA follows the motion of a user's PMD as if magically attached to an invisible tether, a multitouch cinematographer interface in which image capture by the FDA is controlled via multitouch gestures applied by a user to a PMD, and scripted shots in which the user may pre-script shots by physically carrying an FDA or PMD through a scene, to name a few.

Flying Digital Assistant—Localization and Navigation

Figure 2:
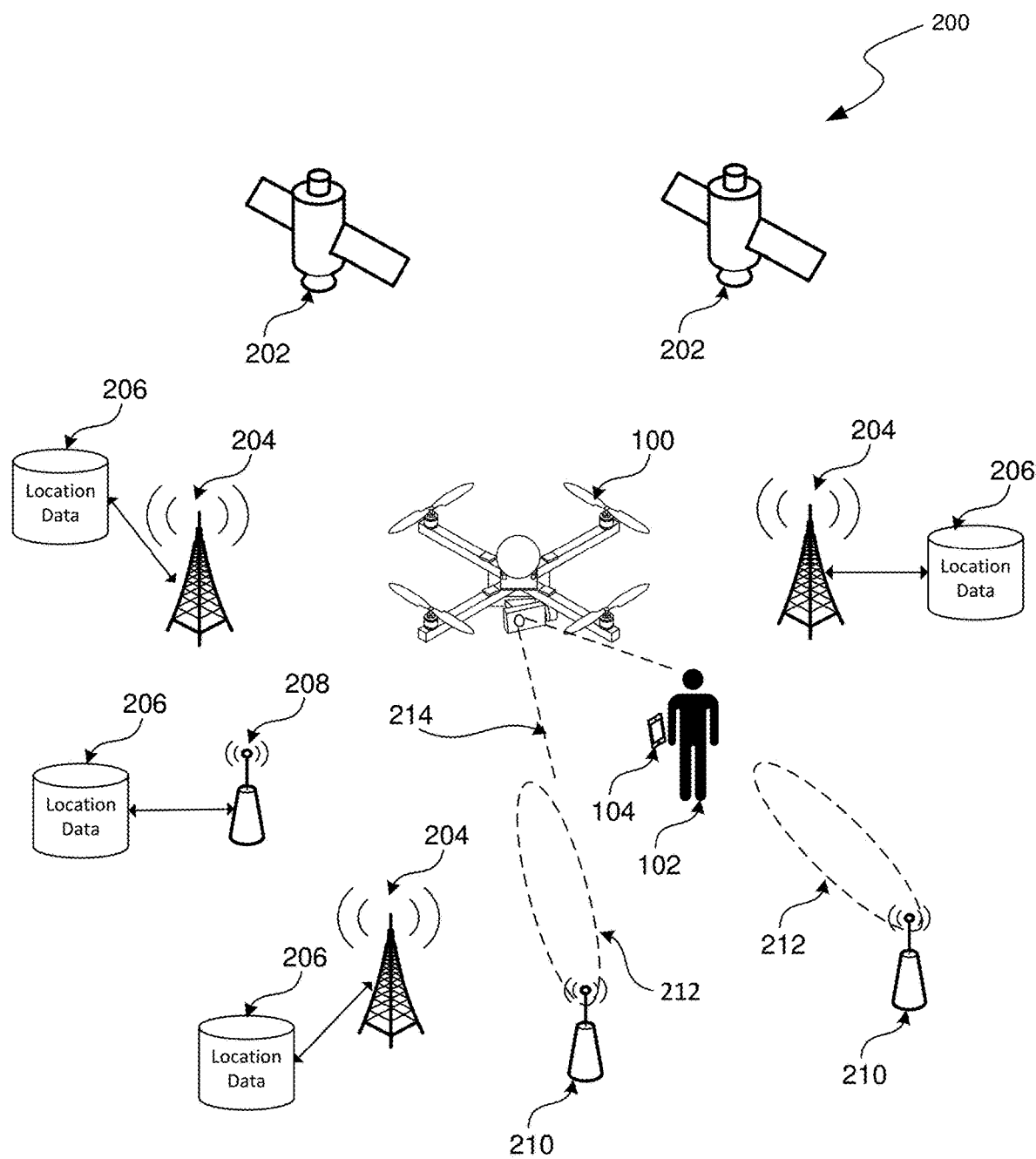
FIG. 2 is a conceptual diagram of a localization and navigation system for guiding navigation and image/video capture by an FDA, according to some embodiments.

FIG. 2 is a high-level illustration of a localization and navigation system 200, according to some embodiments, for guiding navigation and image/video capture by an FDA 100. According to some embodiments, a relative position and/or pose (position+orientation) of the FDA 100, a relative position and/or pose of the subject, and/or a relative position and/or pose of a PMD operated by a user 102 may be determined using one or more of the subsystems illustrated in FIG. 2. Further, this relative position and/or pose data may be used by the FDA 100 to navigate and to track subjects for image and/or video capture. According to the present teaching localization system 200 may include an FDA 100, a GPS system comprising multiple GPS satellites 202, a cellular system comprising multiple cellular antennae 204 (with access to sources of localization data 206), a Wi-Fi system comprising multiple Wi-Fi routers 208 (with access to sources of localization data 206), and a portable multifunction device 104 operated by a user 102. The FDA 100 may comprise components including, but not limited to, an inertial measurement unit (IMU), a GPS receiver, multiple RF receivers and/or transceivers (e.g., cellular LTE, Wi-Fi), and one or more image capture devices. For example, an image capture device may be used to determine position and/or pose through the use of computer vision techniques and or optics-based collision detection and range finding. This is illustrated conceptually in FIG. 2 by the dotted line 214. These components are described in more detail in the section titled "Background on a Flying Digital Assistant" and with reference to FIG. 13. Similarly, the PMD 104 may comprise components including, but not limited to, an inertial measurement unit (IMU), a GPS receiver, multiple RF receivers and/or transceivers (e.g., cellular LTE, Wi-Fi), and an image capture device. Additional information on the components comprising a PMD 104 may be found under the section titled "Background on a Portable Multifunction Device," and with reference to FIG. 14.

As mentioned earlier, a relative position and/or pose (position+orientation) of the FDA 100, a relative position and/or pose of the subject (e.g., user 102), and/or a relative position and/or pose of a PMD 104 operated by a user 102 may be determined using one or more of the subsystems illustrated in FIG. 2. For example, using only the GPS system 202, a position on the globe may be determined for any device comprising a GPS receiver (e.g., the FDA 100 and/or the PMD 104). While GPS by itself in certain implementations may provide highly accurate global positioning it is generally is not capable of providing accurate information regarding orientation. Instead a technique of multiple inputs and multiple outputs ("MIMO") (as illustrated in FIG. 2) may be used for localization, potentially in conjunction with other localization subsystems.

Consider the example based on the illustration in FIG. 2; a user 102 is utilizing an autonomous FDA 100 via a PMD 104 to film herself overhead. In order navigate the FDA and inform the tracking by an image capture device of the subject (in this case the user), a relative position and orientation of the FDA relative to the PMD (or any other point of reference) may be necessary.

According to the present teachings a relative position between the FDA and the PMD may be determined using a GPS system to determine a global position of the FDA, a global position of the PMD and compare the two.

Similarly, using an array of cellular and or/Wi-Fi antennae, a position relative to the known locations of antennae may be determined for both the FDA and PMD using known positioning techniques. Some known positioning techniques include those based on signal trilateration, for example round trip time of arrival (RTT) in which a signal is sent and received by a signal transceiver and distance is calculated based on the elapsed time, received signal strength (RSS) in which the power levels of the transmitted signal and the received signals are analyzed and a distance determined based on a known propagation loss. Other known positioning techniques include those based on signal triangulation, for example angle of arrival (AoA) in which angles of arriving signals are determined and through applied geometry a position determined. Current Wi-Fi standards, such as 803.11n and 802.11ac, allow for RF signal beamforming (i.e., directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 2 by dotted lines 212 emanating from Wi-Fi routers 210.

Figure 3:
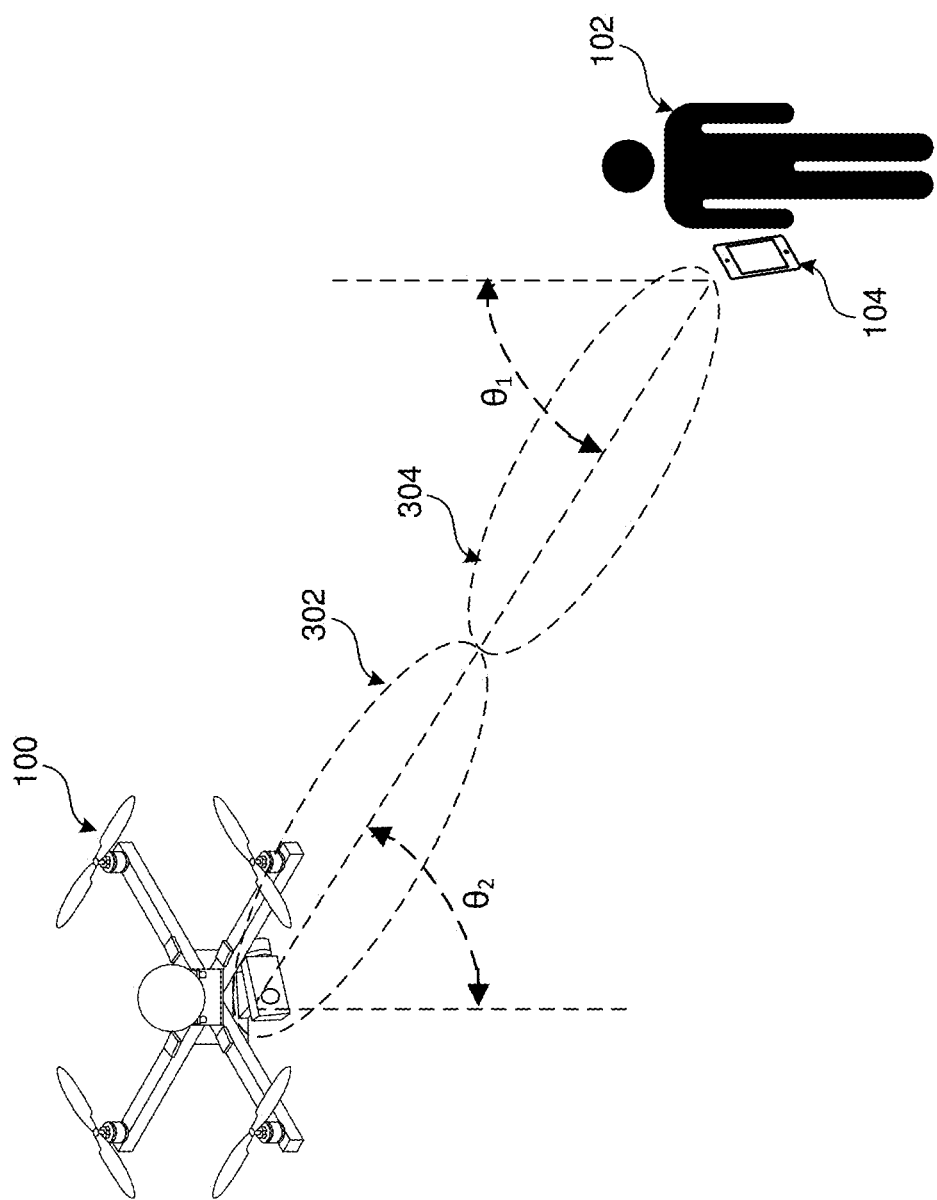
FIG. 3 is a conceptual diagram of system for estimating the position and/or orientation of an FDA using a network of phased array wireless transceivers, according to some embodiments.

As illustrated in FIG. 3, an FDA 100 and/or PMD 104 may include a phased array of Wi-Fi antenna and a relative position and/or pose may be calculated without the necessity for external existing Wi-Fi routers. According to some embodiments, the FDA 100 and/or PMD 104 may transmit and/or receive a beamformed RF signal via a phased antenna array. The FDA 100 and/or PMD 104 may then detect the phase differences and power levels of the respective incoming signals and calculate an AoA for the incoming signals. For example according to FIG. 3, the PMD 104 may determine an AoA of $\theta_1$ for the RF signals 302 transmitted by the FDA 100. Similarly the FDA 100 may determine an AoA of $\theta_2$ for the RF signals 304 transmitted by the PMD 104. This AoA information may then be incorporated with information gathered by an IMU on the FDA 100 and/or PMD 104 (as well as other positioning data as described earlier) in order to infer a relative position and/pose between the FDA 100 and the PMD 104.

Figure 4:
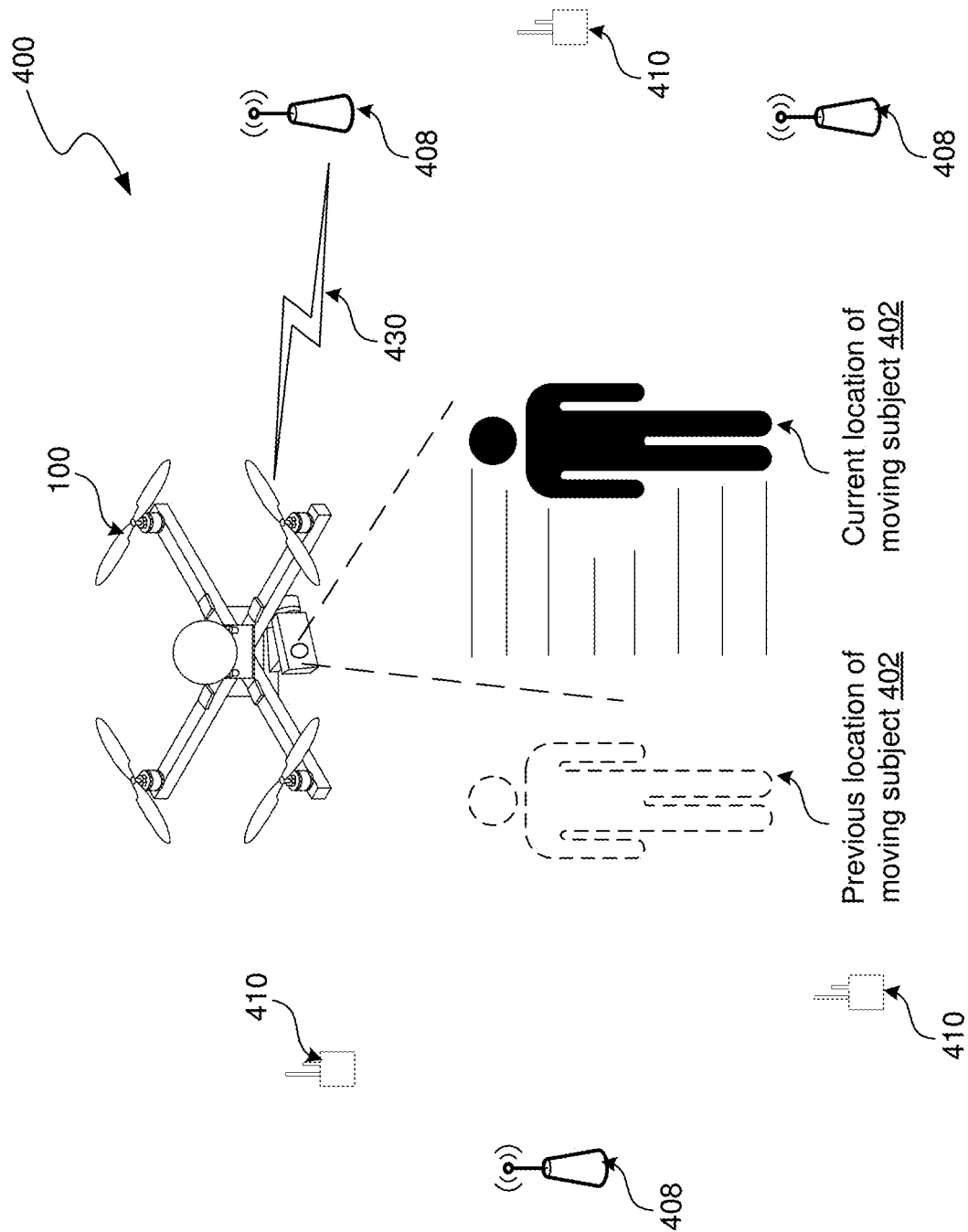
FIG. 4 is a conceptual diagram of an example system passive localization of target object, according to some embodiments.

According to some embodiments, an array of Wi-Fi transmitters and signal monitors may be utilized for device-free passive localization of objects that are not transmitting signals (e.g., a human subject not carrying a PMD). FIG. 4 illustrates an example system 400 for device-free passive localization of an object (e.g., a human subject). In this example a human subject 402 passes through a network of Wi-Fi transmitters 408 transmitting RF signals. The signal monitors 410 (e.g., standard wireless sniffers) may detect changes in the characteristics of the RF signals received from the Wi-Fi transmitters 408 caused by interference as the human subject 402 passes through the signal field. Using localization algorithms, such changes in the RF signal field may be correlated to the presence of an object, its type, its orientation and its location. Also according to FIG. 4, information gathered by device-free passive localization system 400 may be fed wirelessly (e.g., via Wi-Fi connection 430) for to a nearby FDA 100 in order to inform its tracking of the human subject 402.

An inertial measurement unit (IMU) may be used to determine relative position and/or orientation. An IMU is a device that calculates a vehicle's velocity, orientation and gravitational forces using a combination of accelerometers and gyroscopes. As described herein, an FDA 100 and/or PMD 104 may include one or more IMUS. Using a method commonly referred to as "dead reckoning" an IMU (or associated systems) may calculate and track a predicted a current position based on a previously known position(s) using measured velocities and the time elapsed from the previously known position(s). While effective to an extent, the accuracy achieved through dead reckoning based on measurements from an IMU quickly degrades due to the cumulative effect of errors in each predicted current position. Errors are further compounded by the fact that each predicted position is based on an calculated integral of the measured velocity. To counter such effects, an embodiment utilizing localization using an IMU may include localization data from other sources (e.g., the GPS, Wi-Fi, and cellular systems described above) to continuously update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

According to some embodiments, computer vision may be used to determine a relative position and/or orientation of an FDA 100, PMD 104, and or any other object. The term, "computer vision" in this context may generally refer to the acquiring, processing, analyzing and understanding of captured images. Consider again the localization system illustrated in FIG. 2. According to some embodiments, an FDA 100 may include an image capture device and computer vision capabilities. In this example, FDA 100 may be programed to track a user 102 (or other physical object). Using computer vision, an FDA 100 may recognize the captured image as a user 102 (or other physical object) and may use the recognition information to perform aerial maneuvers by the FDA 100 to keep the user 102 (or physical object) in view, and/or may make adjustments to an image stabilization system (discussed in more detail herein) to keep the user 102 (or physical object) in view.

Relative position and/or orientation may be determined through computer vision using a number of methods. According to some embodiments an image capture device of the FDA 100 may be include two or more cameras. By comparing the captured image from two or more vantage points, a system employing computer vision may calculate a distance to a captured physical object. With the calculated distance as well as other position and/or orientation data for the FDA (e.g., data from GPS, Wi-Fi, Cellular, and/or IMU, as discussed above) a relative position and/or orientation may be determined between the FDA 100 and a point of reference (e.g., a captured physical object).

According to some embodiments, an image capture device of FDA 100 may be a single camera (i.e., a non-stereoscopic camera). Here, computer vision algorithms may identify the presence of an object and identify the object as belonging to a known type with particular dimensions. For example, through computer vision, the object may be identified as an adult male human. With this recognition data, as well as other position and/or orientation data for the FDA 100 (e.g., data from GPS, Wi-Fi, Cellular, and/or IMU, as discussed above), FDA 100 may predict a relative position and/or orientation of the object.

Figure 5A:
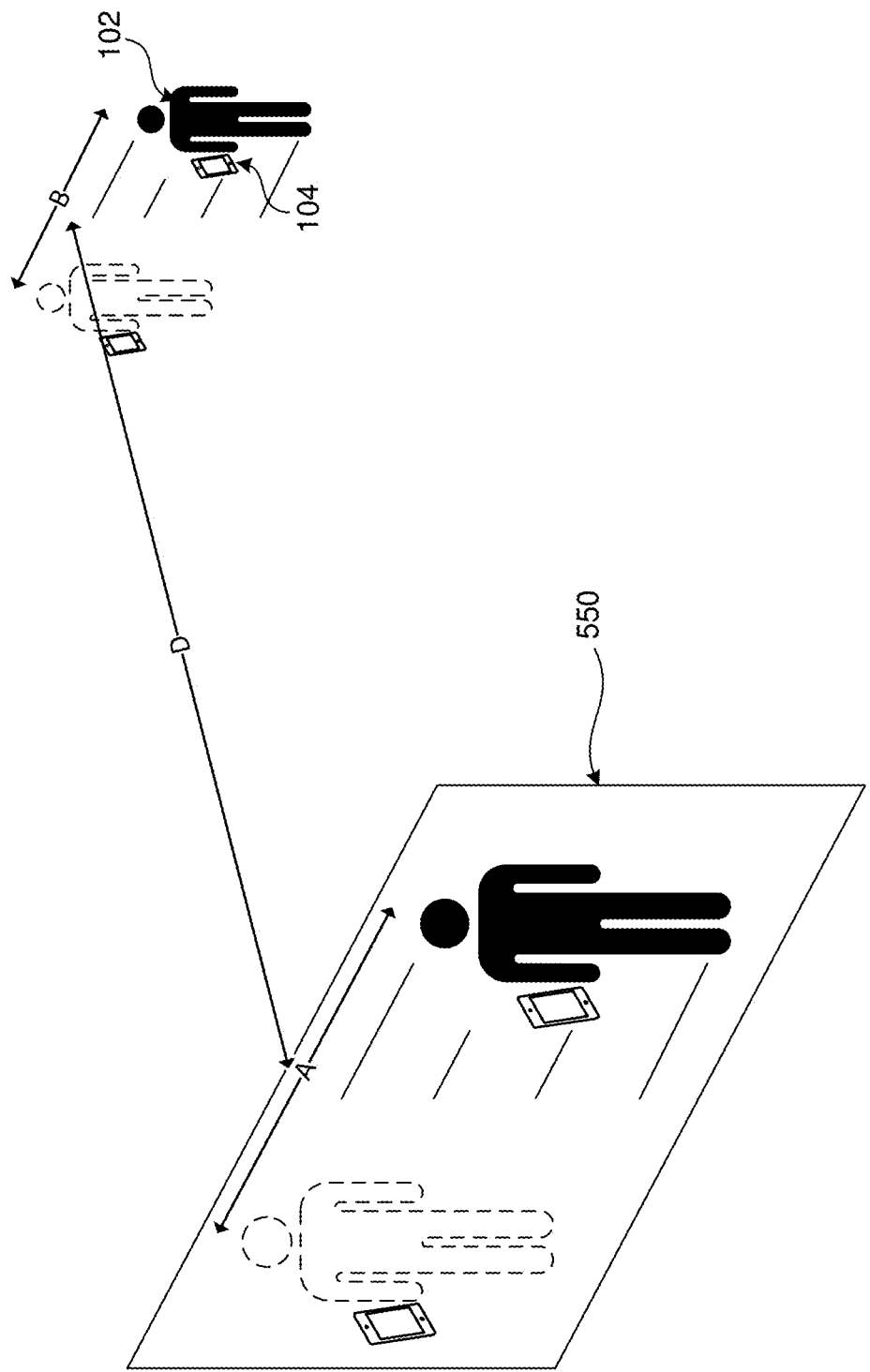
FIGS. 5A-5B illustrate example methods for estimating the position and/or orientation of objects using computer vision technology, according to some embodiments.
Figure 5B:
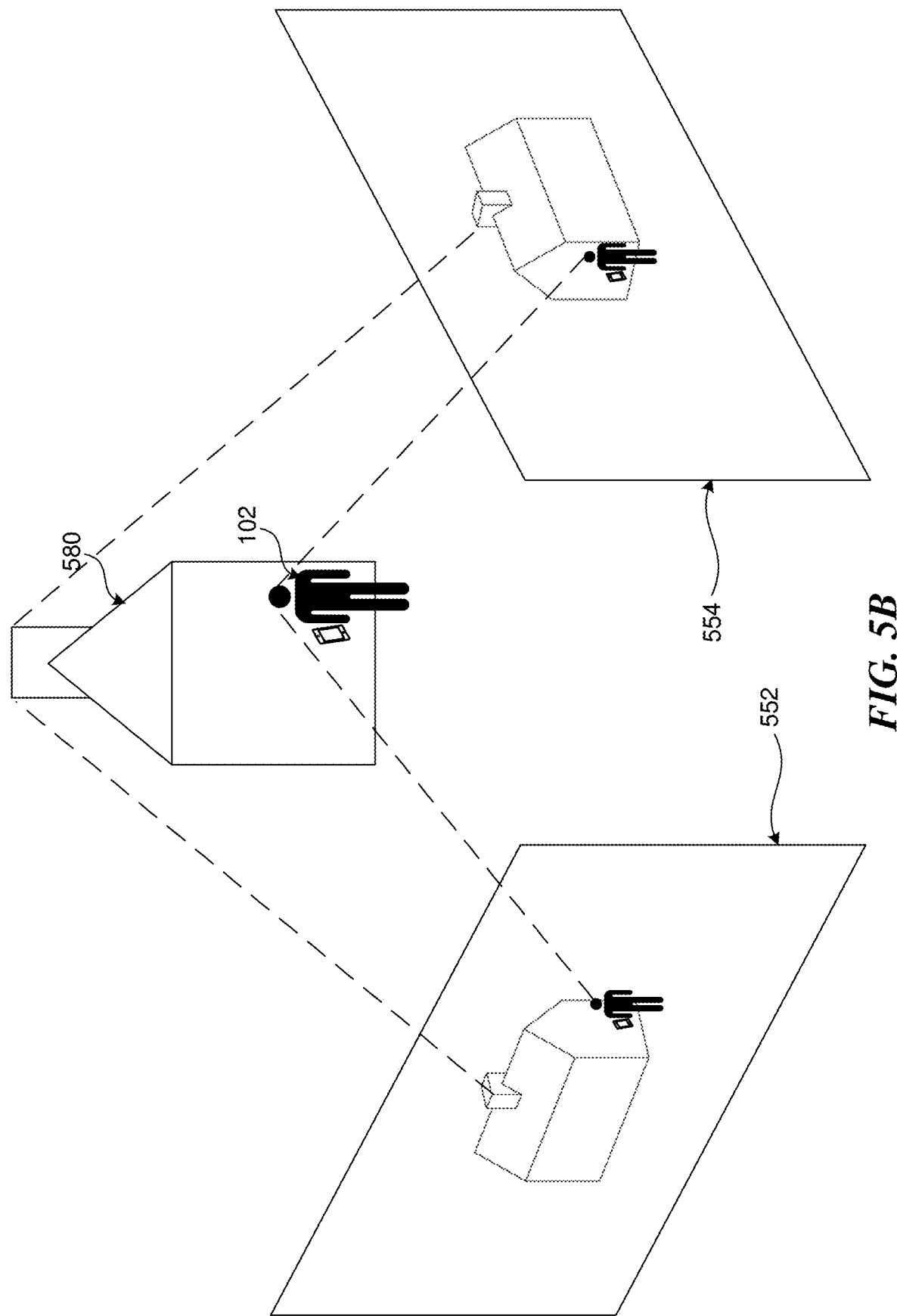

According to some embodiments, computer vision may be used along with measurements from an IMU (or accelerometer(s) or gyroscope(s)) within the FDA and/or PMD 104 carried by a user 102 as illustrated in FIG. 5A-5B. FIG. 5A shows a simplified diagram that illustrates how sensor data gathered by an IMU at a PMD 104 may be applied to sensor data gathered by an image capture device at an FDA 100 to determine position and/or orientation data of a physical object (e.g., a user 102). Outline 550 represents the 2-dimensional image capture field of view at an FDA 100. As shown in FIG. 5A, the field of view includes the image of a physical object (here user 102) moving from one position to another. From its vantage point, FDA 100 may determine a distance A traveled across the image capture field of view. The PMD 104, carried by user 102, may determine an actual distance B traveled by the user 102 based on measurements by internal sensors (e.g., the IMU) and an elapsed time. The FDA 100 may then receive the sensor data and/or the distance B calculation from PMD 104 (e.g., via wireless RF signal). Correlating the difference between the observed distance A and the received distance B, FDA 100 may determine a distance D between FDA 100 and the physical object (user 102). With the calculated distance as well as other position and/or orientation data for the FDA 100 (e.g., data from GPS, Wi-Fi, Cellular, and/or IMU, as discussed above) a relative position and/or orientation may be determined between the FDA 100 and the physical object (e.g., user 102).

Alternatively, estimations for the position and/or orientation of either the FDA 100 or PMD 104 may be made using a process generally referred to as "visual inertial odometry" or "visual odometry." FIG. 5B illustrates the working concept behind visual odometry at a high level. A plurality of images is captured in sequence as a camera moves through space. Due to the movement of the camera, the images captured of the surrounding space change from frame to frame. In FIG. 5B, this is illustrated by initial image capture field of view 552 and a subsequent image capture field of view 554 captured as the camera has moved from a first position and orientation to a second position and orientation over an elapsed time. In both images, the camera may capture real world physical objects, for example, the house 580 and/or the human subject (e.g., user) 102. Computer vision techniques are applied to the sequence of images to detect and match features of physical objects captured in the field of view of the camera. For example, in FIG. 5B, features such as the head of a human subject 102 or the corner of the chimney on the house 580 are identified, matched, and thereby tracked. By incorporating sensor data from an IMU (or accelerometer(s) or gyroscope(s)) associated with the camera to the tracked features of the image capture, estimations may be made for the position and/or orientation of the camera over time. This technique may be applied at both the FDA 100 and PMD 104 to calculate the position and/or orientation of both systems. Further, by communicating the estimates between the systems (e.g., via a Wi-Fi connection) estimates may be calculated for the respective positions and/or orientations relative to each other. As previously mentioned, position, orientation, and motion estimation based in part on sensor data from an on board IMU may introduce error propagation issues. As previously stated, optimization techniques may be applied to position, orientation, and motion estimations to counter such uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data.

According to some embodiments, computer vision may include remote sensing technologies such as laser illuminated detection and ranging (LIDAR or Lidar). For example, an FDA 100 equipped with LIDAR may emit one or more laser beams in a continuous scan up to 360 degrees in all directions around the FDA 100. Light received by the FDA 100 as the laser beams reflect off physical objects in the surrounding physical world may be analyzed to construct a real time 3D computer model of the surrounding physical world. Such 3D models may be analyzed to identify particular physical objects (e.g., a user 102) in the physical world for tracking. Further, images captured by cameras (e.g., as described earlier) may be combined with the laser constructed 3D models to form textured 3D models that may be further analyzed in real time or near real time for physical object recognition (e.g., by using computer vision algorithms).

The computer vision-aided localization and navigation system described above may calculate the position and/or pose of features in the physical world in addition to the position and/or pose of the FDA 100 and/or PMD 104. The position of these features may then be fed into the navigation system such that motion trajectories may be planned that avoid obstacles. In addition, in some embodiments, the visual navigation algorithms may incorporate data from proximity sensors (e.g., electromagnetic, acoustic, and/or optics based) to estimate obstacle position with more accuracy. Further refinement may be possible with the use of stereoscopic computer vision with multiple cameras, as described earlier.

According to some embodiments, the previously described relative position and/or orientation calculations may be performed by an FDA 100, PMD 104, remote computing device(s) (not shown in the figures), or any combination thereof.

The localization system 200 of FIG. 2 (including all of the associated subsystems as previously described) is only one example of a system for localization and navigation. Localization system 200 may have more or fewer components than shown, may combine two or more components, or a may have a different configuration or arrangement of the components. Some of the various components shown in FIGS. 2 through 5 may be implemented in hardware, software or a combination of both hardware and software, including one or more signal processing and/or application specific integrated circuits.

Flying Digital Assistant—Add-on Module

Figure 13:
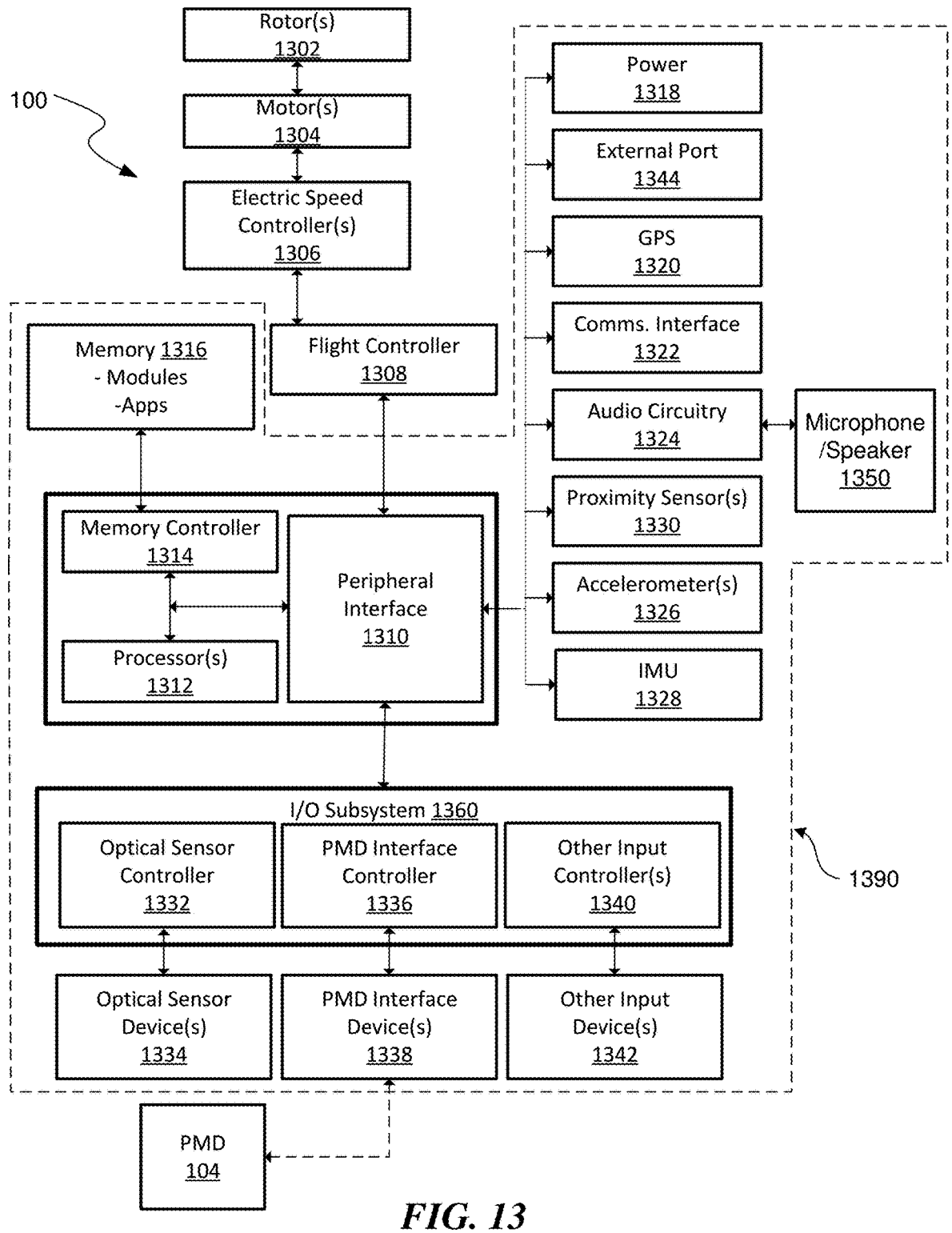
FIG. 13 is a system diagram of components in an example FDA, according to some embodiments.

According to some embodiments an add-on module may comprise software and/or hardware components and may be functionally coupled to an existing unmanned aerial vehicle (UAV) thereby giving the existing UAV the functionality of an FDA according to the present teachings. According to some embodiments, an add-on module may transmit and receive data from a user's PMD, and may process and interpret commands and may talk to the existing UAV's flight controller an image capture device. According to other embodiments the add-on module may further comprise its own image capture device with a computer vision controller. As seen in FIG. 13 which illustrates an example FDA according to the present teachings, the add-on module may comprise any combination of software and/or hardware necessary to convert an existing UAV into an FDA in accordance with the present teachings. For example, an add-on module may comprise the components within the dotted line boundary 1390.

According to some embodiments an off-the-shelf PMD (for example an iPhone®) may serve as an add-on module when functionally coupled to an existing UAV.

The add-on module in some embodiments may communicate with the existing UAV wirelessly, via the same interface that a human pilot would with a wireless remote control.

In some embodiments, the add on module may be treated as another source of position data. For example, by incorporating position data as discussed earlier in this section, the add on module may provide GPS-like position data even when no GPS is available, and in this way may effectively serve as a more reliable GPS receiver.

Flying Digital Assistant—Omnidirectional Camera Ball

Figure 6:
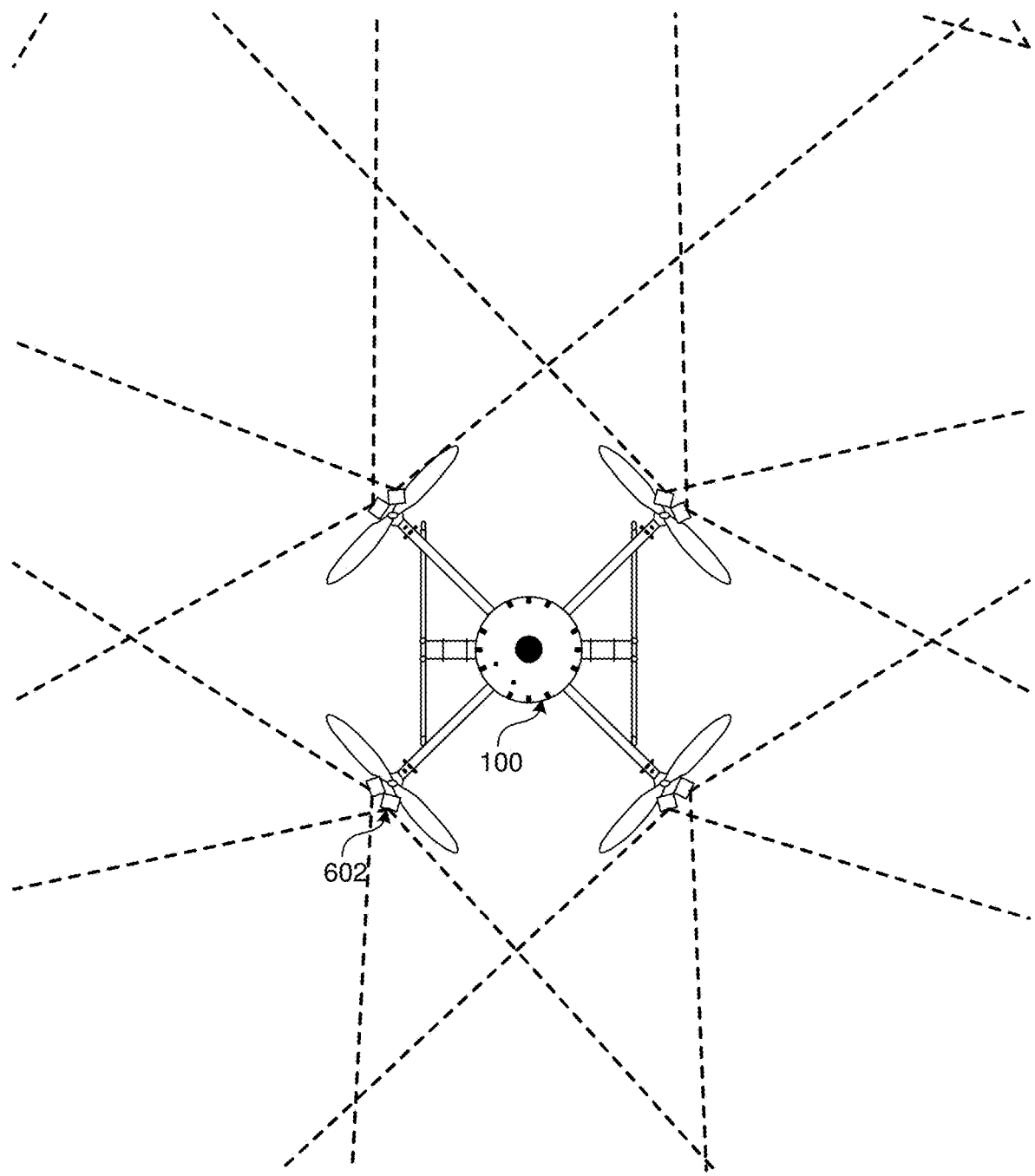
FIG. 6 is a high-level illustration of an omnidirectional camera ball, according to some embodiments.

According to some embodiments, FDA 100 may comprise multiple high-resolution image capture devices 602 ("cameras") with spatial offsets from each other, thereby providing the capability to capture a full view of the world in all directions. The cameras may be arranged such that at least two cameras are capable of viewing every angle, thereby allowing for 3D image/video capture and depth recovery (e.g., through computer vision algorithms) at every angle. According to some embodiments each camera may include a "fisheye" lens. For example, FIG. 6 shows a high-level illustration of the concept of multiple cameras with overlapping fields of view as represented by the dotted lines. FIG. 6 is provided to illustrate the concept, but does not indicate a particular configuration or geometry as a limitation. According to some embodiments, an FDA in accordance with the present teachings may include more or fewer cameras.

According to some embodiments the position and orientation of each camera may be calibrated to an onboard inertial measurement unit (IMU).

According to some embodiments, a monocular navigation algorithm may be run for each camera paired with an on board IMU and as the relative position and orientation calibration is dialed in, stereo correspondence may be performed on observed primitives representing a pair of corresponding image features captured by a pair of cameras in order to provide a more robust estimation of distance to the objects.

Flying Digital Assistant—Hybrid Mechanical/Digital Gimbal

An FDA 100 according to the present teaching may include an image capture adjustment and stabilization system. Capturing images and video from a vehicle in motion (such as from an FDA 100) may lead to quality issues such as blur, shake, and disorientation. Image stabilization may generally refer to techniques used to counter these effects and produce a clear stable image even when captured by a vehicle in motion.

A number of techniques and devices for image stabilization are currently known. For example, a multi-axis mechanical gimbal device may, through the use of gyroscopes and mechanical actuators along two or more axis, physically stabilize an image capturing device (e.g., camera) coupled to a mobile platform. An example of a multi-axis gimbal currently available is the Freefly MoVI®. While effective in certain implementations, multi-axis mechanical gimbals may add significant mechanical and systems complexity as well as weight to a FDA 100. Alternatively, captured digital images may be digitally "stabilized" using digital image processing to manipulate the image. For example, Parrot offers a drone with a motionless 180 degree camera with a fisheye lens. Using post processing and crop filters may result in a "stabilized" image. While effective in certain implementations, full digital image stabilization may reduce image quality due to image sensor resolution limits, and in the case of using crop filters may require capturing more data than is necessary.

Instead an FDA 100 according to the present teachings may include a hybrid approach comprising a single axis mechanical gimbal along with real-time image processing (herein referred to as a "digital gimbal"). A single axis gimbal capable of adjusting the orientation of the image capture device in conjunction with the yaw control of the FDA 100 and digital image processing may produce a full range or image capture from looking straight down from the FDA 100 to the ground to looking straight up from the FDA 100 to the sky while providing an effective minimum in overall system complexity.

According to some embodiments, a single axis mechanical gimbal, as part of a hybrid approach described above, would adjust the pitch of the image capture device. Adjusting pitch as opposed to roll or yaw, would allow for overall camera range of motion where the FDA 100 is implemented as a rotary vehicle, for example a quadcopter (see Section titled "Background on Flying Digital Assistant" for additional information). This has to do with the way in which the flight of a quadcopter is controlled. Generally, a quadcopter is controlled by varying the orientation of its vertical axis. In other words, in a hover the quadcopter's vertical axis is perpendicular to the ground. In order to move left or right, forwards or backwards, the angular velocity of the four rotors are adjusted, and the quadcopter tilts in the direction that it intends to move. This method of control leaves the quadcopter free to determine yaw, thus effectively "gimbaling" the yaw axis. While using yaw to point at a desired subject may be difficult for a human pilot, it can be accomplished by the FDA's flight control system and the localization techniques described herein. Accordingly, utilizing a pitch gimbal gives maximum possible view range of motion since the yaw of the image capture device is easily controlled by adjusting the yaw of the quadcopter itself and the roll of the image capture device is easily controlled through digital image processing, for example simple image rotation transforms.

Magic Wand Interface—A User Interaction Paradigm

Figure 7A:
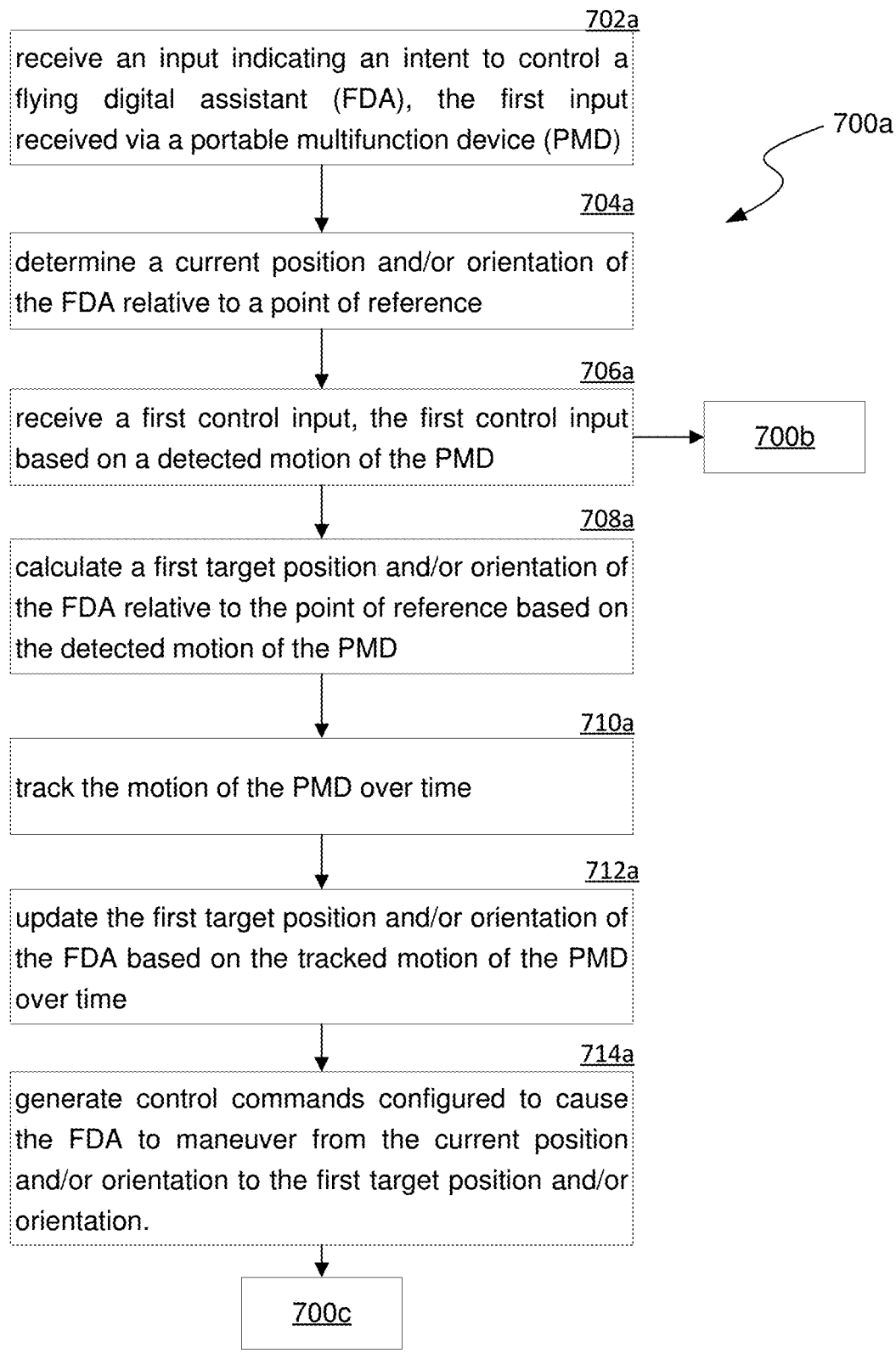
FIGS. 7A-7C are flow charts describing example processes for controlling an FDA using a magic wand user interaction paradigm, according to some embodiments.
Figure 7B:
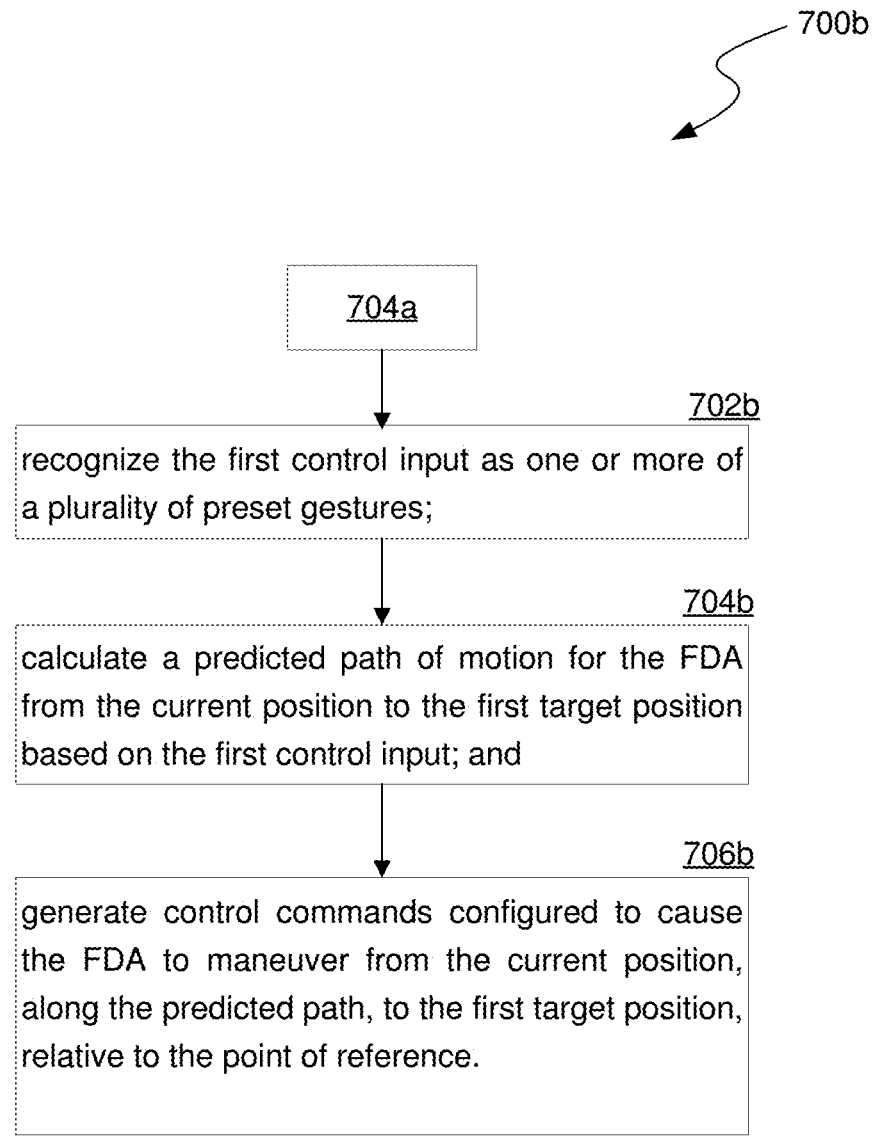
Figure 7C:
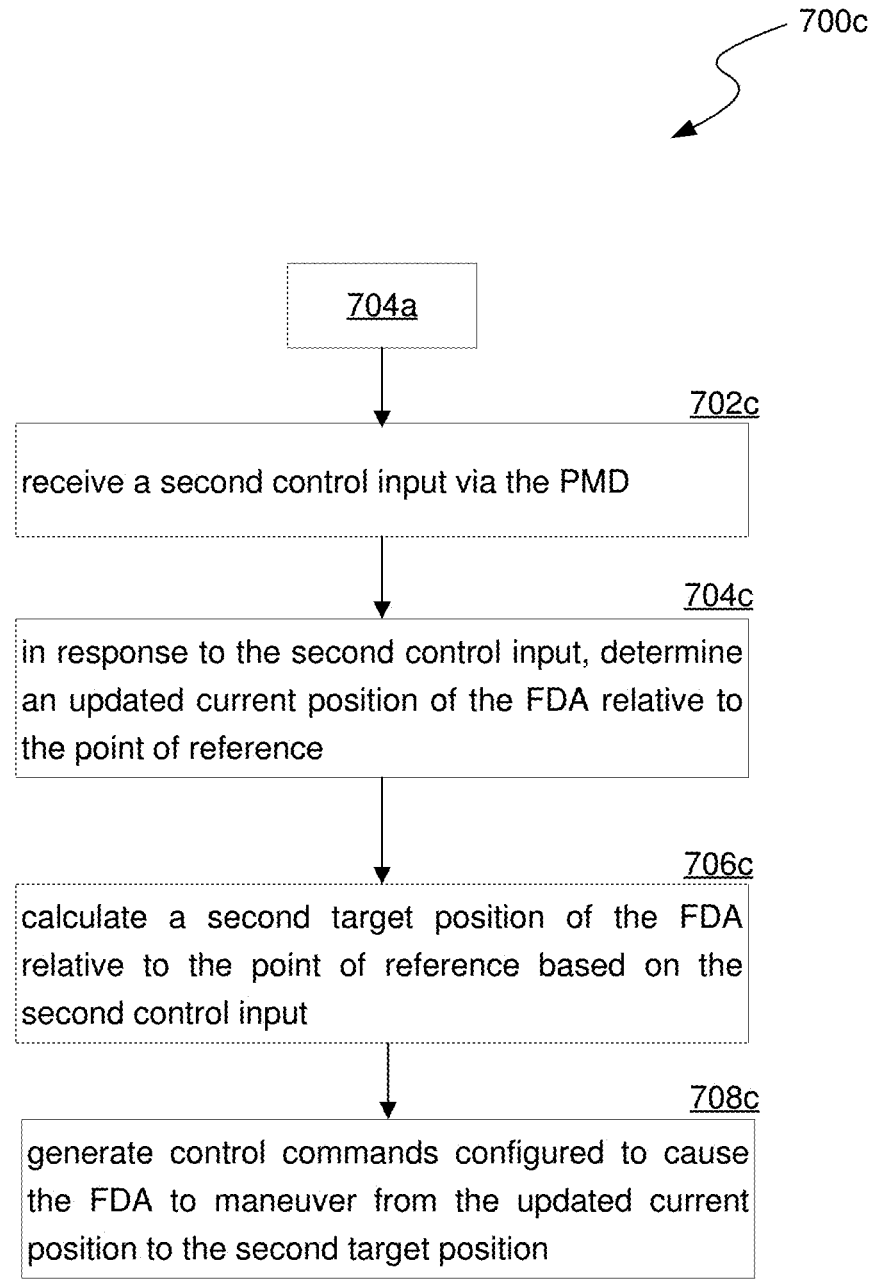

FIGS. 7A-7C are flow charts illustrating example methods 700a-700c of controlling an FDA using a PMD and the magic wand user interaction paradigm. According to these embodiments, a user 102 points a PMD 104 at an FDA 100 and is able to move the FDA 100 through the air by moving PMD 104 such that the overall effect is (from the perspective of user 102) that FDA 100 is "magically" tied to PMD 104 by an invisible tether.

Method 700a begins at step 702a by receiving an input indicating an intent to control the FDA 100. In some embodiments this input is received via the PMD 104. For example, a user 102 may push a button at the PMD 104 (e.g., a virtual button via a touch screen display). In some embodiments, the input may be based on a position and/or orientation of the PMD 104, for example, a user 102 may provide this input by simply pointing the PMD 104 at an FDA 100. According to some embodiments, the user 102 need only point the PMD 104 in the general direction of the FDA 104. The preceding step may further comprise calibrating the relative position and/or orientation between the FDA 100 and the PMD 104. For example, when the user presses the button on the PMD 104 a relative position and/or orientation may be calibrated. Because of this calibration, the user 102 need not point exactly at the FDA 100. Instead, where the user points the PMD 104 in the general direction the FDA 100, when the user presses the button on the PMD, relative position and orientation is calibrated to assume that the PMD 104 is pointed directly at the FDA 100.

At step 704a, in response to the first input, a current position and/or orientation of the FDA 100 relative to a point of reference may be determined. The point of reference may be arbitrarily assigned here. The point of reference may be according to a global frame of reference or may be according to a relative frame of reference (e.g., relative to a moveable object such as PMD 104 in the global frame of reference). In some embodiments, the current position and/or orientation of the FDA 100 may be determined using any of the localization techniques previously discussed, including, but not limited by using sensor data gathered by sensors at the FDA 100.

At step 706a, a first control input may be received, the first control input based on a detected motion (e.g., change in position and orientation) of the PMD 104, for example, based in part on sensor data gathered by sensors (e.g., accelerometers, IMU, etc.) at the PMD 104. In some embodiments, this first control input may indicate a maneuver to be performed by the FDA 100. According to some embodiments, the input may be a gesture mimicking the maneuver that the user 102 intends the FDA 100 to perform. For example, according to some embodiments, the user 102 (while holding down the button down on the PMD 104) may gesture with their arm in an upward sweeping motion indicating for the FDA 100 to take off from the ground. Similarly, according to some embodiments, the user 102 (while holding the button down on the PMD 104) may gesture with their arm in a sweeping motion from the left to the right indicating for the FDA to follow the user's arm from the left to the right. Similarly, according to some embodiments, the user 102 (while holding the button down on a touch screen display of a PMD 104) may gesture with their finger up or down on the touch display indicating for the FDA 100 to increase or decrease relative distance between itself and the PMD 104. Further, in some embodiments, a PMD 104 may not be necessary and a first control input may be based on a motion of the user or a part of the user (e.g., the user's arm). For example, in such an embodiment, sensors at the FDA 100 or in the surrounding environment (e.g., a passive localization system based on Wi-Fi and/or visual sensors) may detect a second change in position of the user 102. Such a change may be the user 102 sweeping their arm up and down or left and right instead of sweeping a PMD 104 held in their hand.

At step 708a, a first target position and/or orientation of the FDA 100 relative to the point of reference, may be calculated based on the detected motion of the PMD 104.

At steps 710a-712a the position and orientation of the PMD 104 may be tracked over time (e.g., over a predetermine time period) and the calculations for the first target position and/or orientation may by update in real time or near real time, based on the tracked motion of the PMD 104 over time. In other words, as a user 102 begins to move the PMD 104, a point in space relative to a reference point may be calculated to which the FDA 100 will be instructed to fly. As the user 102 goes through their motion with the PMD 104, this target position may be continuously updated in real time or near real time. This target position and/or orientation (continuously changing) may be used to generate control commands at step 714*a* configured to cause the FDA 100 to fly to the target position and/or orientation. As explained earlier, nonlinear estimation algorithms (one embodiment being an "extended Kalman filter") may be applied to a series of measured positions and/or orientations to produce a real-time optimized prediction of the current position and/or orientation of the FDA 104 and/or PMD 104 based on assumed uncertainties in the observed data. Such an approach may be especially useful where a process of visual inertial odometry is used for position/orientation estimation.

In some embodiments, a three-dimensional coordinate system relative to the point of reference may be defined, where any given point in the coordinate system is defined by a first, second, and third coordinate. The generated commands may be configured such that the position of the FDA 100 at any point between the current or initial position and the target position is constrained such that the first coordinate remains constant or substantially constant. For example, in the case of a cylindrical coordinate system, and with reference to FIG. 8E, the motion of the FDA 100 may be constrained a radial distance R from a reference axis (e.g., along the z direction) intersecting the point of reference (e.g., at the user 102 or PMD 104). The resulting motion of the FDA 100 corresponding to a change in the azimuth angle $\theta$ about the reference axis and/or a change in the distance z along the reference axis over time. As another example, in the case of a spherical coordinate system, and with reference to FIG. 8D, the motion of the FDA 100 may be constrained a radial distance R from the reference point. The resulting motion of the FDA 100 corresponding to a change in the azimuth angle $\theta$ about a reference axis intersecting the point of reference and/or the inclination angle $\varphi$ off a reference plane normal to the reference axis.

With reference to FIG. 7B, at step 702*b* the first control input may be recognized as one or more of plurality of preset gestures. Accordingly, at step 704*b*, a predicted path of motion may be calculated based on the received gesture, and at step 706*b* control commands may be generated that are configured to cause the FDA 100 to fly the predicted path. Such an embodiment may provide for simpler motion calculations for the FDA as the gesture (as input by moving the PMD 104) is recognized resulting in one or more preset maneuvers.

With reference to FIG. 7C, at step 702*c*, a second control input may be received and the steps of determining the position and/or orientation of the FDA, calculating a target position and/or orientation, and generating control commands repeated (steps 704*c*-708*c*) in response to the third input. Here, instead of the motion being constrained as described with respect to FIG. 7A, the motion resulting from the second control input may be constrained along a radial direction from the point of reference or a reference axis, for example, as described with respect to FIG. 8B. This second control input might be received as manipulation of a slider bar on touch screen display or as a motion with the PMD 104 away from or closer to the user's body.

The FDA 100 may then maneuver in response to the input provided by the user according to the determination in the previous step. According to some embodiments, the FDA may maneuver such that from the perspective of the user, the FDA 100 appears to be magically tied to PMD 104 via an invisible tether.

Further, the user 102 may provide an input indicating a release of control over the FDA 100. For example, according to some embodiments, the user may release the button pressed at the PMD 104 as described in earlier steps.

The FDA 100 may then maneuver in response to the input indicating release in the prior step. According to some embodiments the FDA 100 may maintain a hover when the user 102 releases the button. According to some embodiments the FDA 100 may land when the user 102 releases a button. According to some embodiments the FDA 100 may continue on its most recent trajectory when the user 102 releases the button. According to some embodiments the FDA 100 may continue on its most recent trajectory and smoothly transition to a hover when the user 102 releases the button.

According to some embodiments, the methods described in FIGS. 7A-7C may further comprise tracking the relative position of the user and/or another subject (e.g., via methods previously described). According to some embodiments, these methods may further comprise initiating image and/or video capture of a user and/or another subject via an image capture device on the FDA 100. For example, as the user 102 moves the FDA 100 using the "magic wand" technique previously described the image capture device may track the user 102 and keep the user 102 centered and in focus in the field of view. Such capture and tracking may involve the methods and systems described previously related to localization and image stabilization.

According to some embodiments, the previously described steps of methods 700*a*-700*c* may involve calculations performed by the FDA 100, the PMD 104, a remote computing device(s) (e.g., a network connected server) or any combination thereof. For example, the PMD 104 may transmit data related to inputs from the user 102 and the motion of the PMD 104 via a wireless RF signal (e.g., Wi-Fi) to the FDA 100. Having received this data, the FDA 100 may interpret the input and motion data of the PMD 104 and calculate and perform in real time, maneuvers in response to the received data. According to some embodiments both the PMD 104 and the FDA 100 may be wirelessly connected to a wide area network (e.g., via a cellular LTE data connection). Here, the PMD 104 and FDA 100 may transmit data related to location and/or orientation to a remote computing device (e.g., a network connected server) and the remote computing device may determine a relative position and orientation between the FDA 100 and the PMD 104. The PMD 104 may then transmit data related to inputs from the user 102 and the motion of the PMD 104 via a wireless RF signal (e.g., cellular LTE) to the remote computing device. Having received this data, the remote computing device may interpret the input and motion data of the PMD 104 and calculate a maneuver to be performed by the FDA 100. Having calculated the maneuver to be performed by the FDA 100, the remote computing device may transmit data associated to the maneuver to the FDA 100. Having received the data associated with the maneuver, the FDA 100 may perform the maneuver. According to some embodiments this may all occur in near real time using low-latency network connection.

Figure 8A:
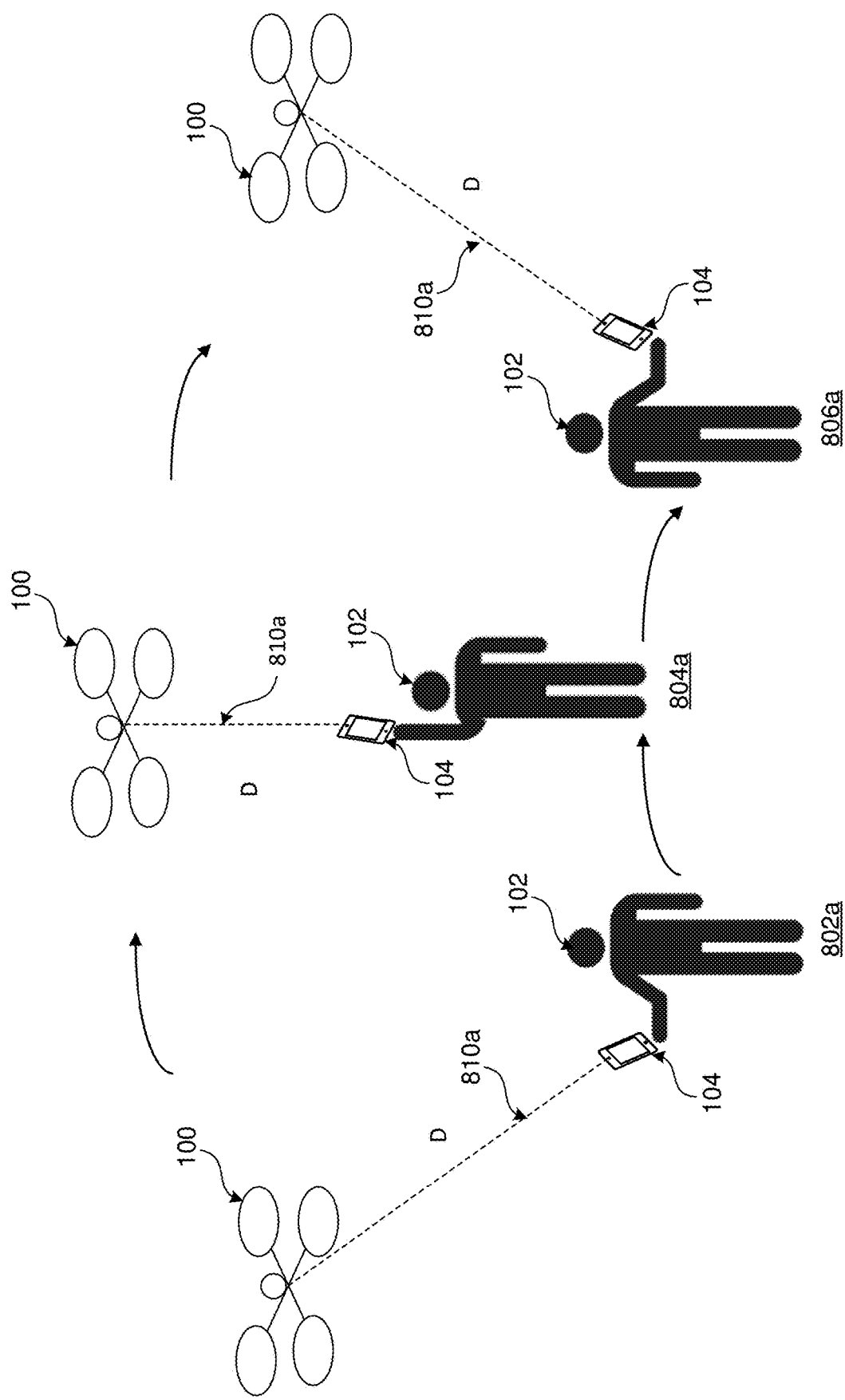

FIG. 8A shows a sequence of steps 802*a*-806*a* illustrating how an FDA 100 may respond to control by a PMD 104 using the "magic wand" technique, according to some embodiments. As shown in FIG. 8A, the sequence begins at step 802*a* with a user 102 providing an input via PMD 104 indicating an intent to control the FDA 100, for example, by pressing a button via the touch screen of the PMD. In this example step 802*a*, the FDA is a distance D from the PMD 104 as indicated by dotted line 810*a*. In some embodiments, the FDA 100 may maintain its current position/orientation (e.g., a relative distance D to the current position/orientation of PMD 104), once the input indicating intent to control is received. In some embodiments, the FDA 100, may automatically maneuver to a pre-defined position and orientation relative to a reference point (e.g., PMD 104). In either case, once control is initiated, the FDA will automatically perform maneuvers in response to changes in the position/orientation of PMD 104 such that the FDA 100 appears to be tied to an invisible tether (represented by dotted line 810*a*). In FIG. 8A, the user 102, while holding PMD 104, sweeps to the right, as represented by sequence steps 802*a*-806*c*. Here, the PMD 104 is maintained at roughly the same orientation as it sweeps from left to right. In response, the FDA 100 may maintain altitude, while maneuvering from left to right, here, while maintaining a constant distance D from a reference point (e.g., PMD 104 or user 102).

FIG. 8B illustrates another way in which an FDA 100 may respond to control by a PMD 104 using the "magic wand" approach, according to some embodiments. Here, a user 102, controlling the FDA 100 using the PMD 104 may increase the relative distance D to the FDA 100 by providing input via the PMD 104. For example, in some embodiments, a user 102 may manipulate a slider bar on the touch screen of PMD 104. In response the FDA 100 will increase or decrease the separation distance D to a reference point (e.g., PMD 104 or user 102). Note, as shown in FIG. 8B, if the relative orientation of PMD 104 remains the same, FDA 100 may increase separation distance D while maintaining an angle of elevation θ such that the FDA 100 responds as if tie to an invisible tether (as represented by dotted line 810*b*, now increasing or decreasing in length. The resulting motion of the FDA 100 may be thought of as analogous to that of a kite's motion in response to pulling in or letting out slack on the attached string. In an alternate embodiment, a user 102 may control FDA 100 as described above by moving PMD 104 closer to and further away from their body. In such a configuration the change of position of PMD 104 relative to a reference point is translated and scaled to an associated change in position of FDA 100. For example, if user 102 moves PMD 104 five inches further from their body, FDA 100 may respond by the separation distance D by five feet.

Figure 8C:
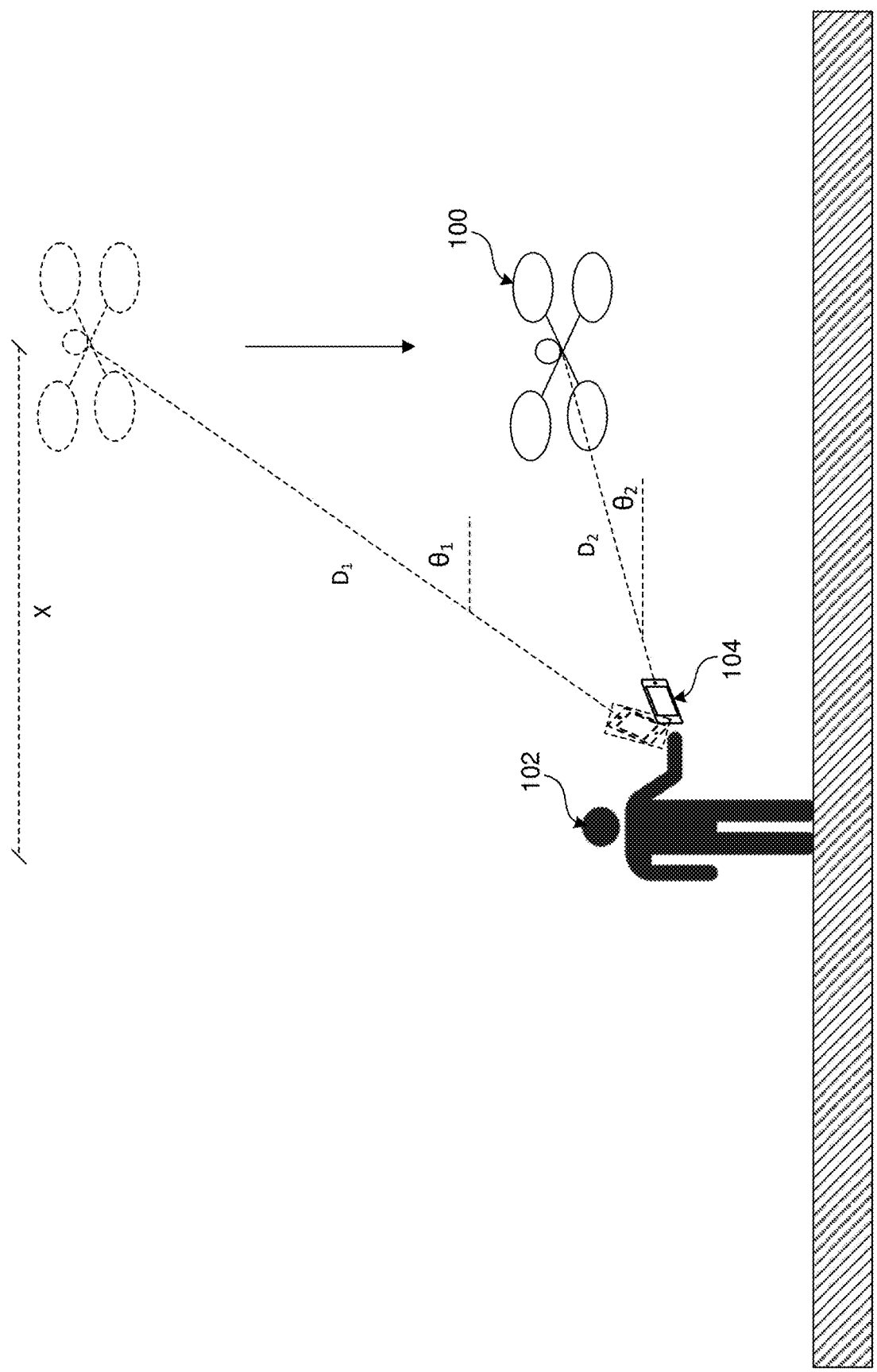

FIG. 8C illustrates another way in which an FDA 100 may respond to control by a PMD 104 using the "magic wand" technique, according to some embodiments. Here a user 102 may adjust the altitude of the FDA 100 by changing the orientation of PMD 104. For example, as shown in FIG. 8C, in response to a change in pitch of the PMD 104 about a single axis, the FDA 100 may decrease its altitude while maintaining a ground distance X to a reference point (e.g., user 102 or PMD 104). The resulting maneuver decreases the separation distance $D_1$ to $D_2$ and the angle of elevation to the reference point from $θ_1$ to $θ_2$. Alternatively, user 102 may increase or decrease the altitude of the PMD 104 to induce a similar motion by the FDA 104. For example, if user 102 lowers the PMD 104 by five inches, the FDA 100 may decrease altitude by five feet.

According to some embodiments, the FDA 100 may maneuver according to an absolute fixed coordinate system. In other words, user inputs and gestures may correspond with an instruction to move to an absolute point in space. The FDA 100 may also maneuver according to a coordinate system relative to a "point of reference," as described with respect to FIGS. 8A-8C. The point of reference may be defined as at or associated with a physical object in physical space. For example, the point of reference may be the PMD 104 through which the user 102 provides input. The point of reference may also be another point in space that is selectable via the PMD 104 by clicking on a location of interest on a map or image. For example, a user 102 viewing a live video feed from the FDA 100 through the touch display of the PMD 104 may touch a point or select a displayed object to redefine the point of reference about which motion is defined. The point of reference may also be completely arbitrary. A relative coordinate system may simplify the motion calculations necessary to maneuver the FDA 100. Further, motion relative to a moving point of reference may allow for more intuitive control by the user 102.

Figure 8D:
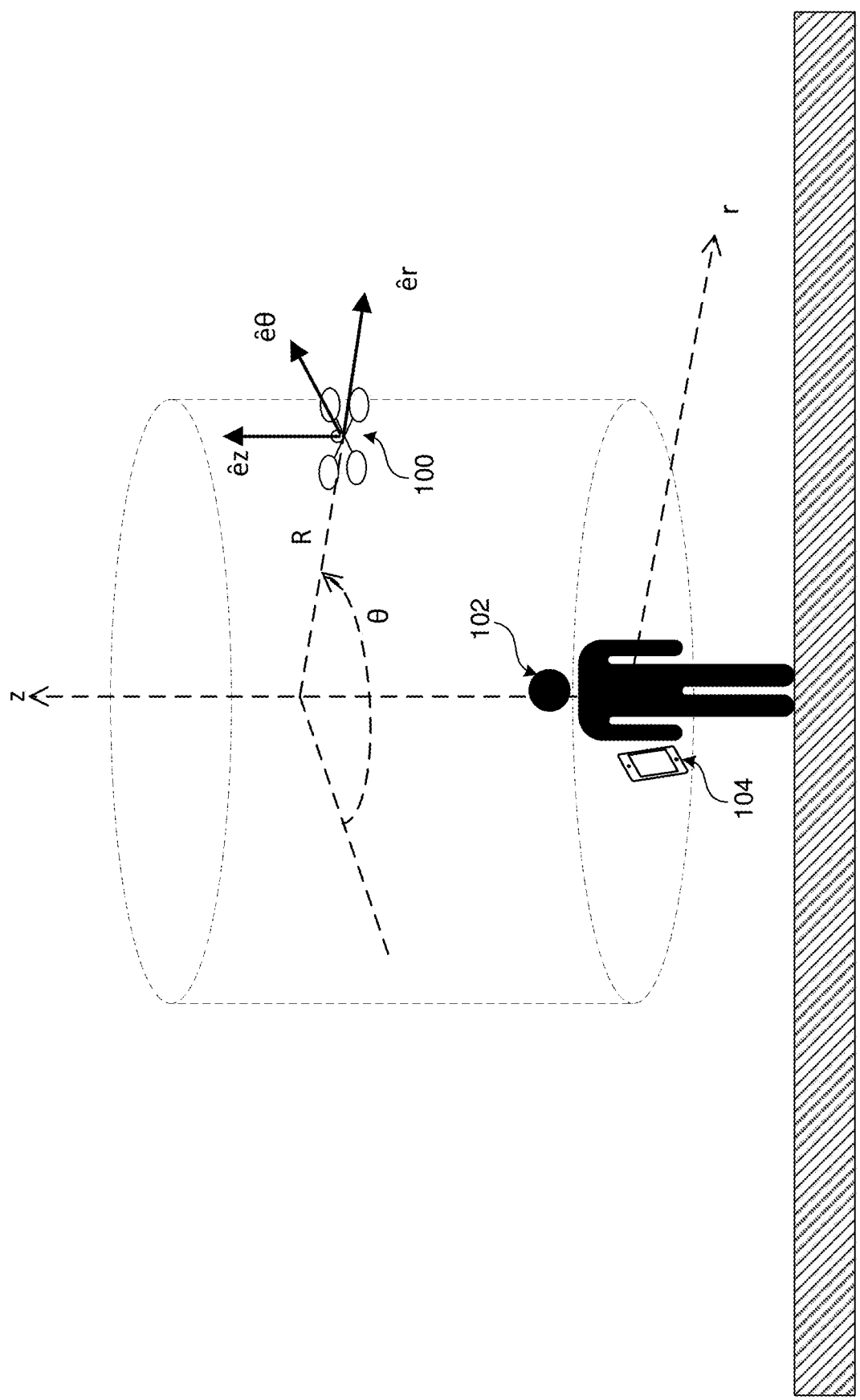
FIGS. 8D-8E illustrate various examples for understanding and describing the motion of an FDA relative to a point of reference.
Figure 8E:
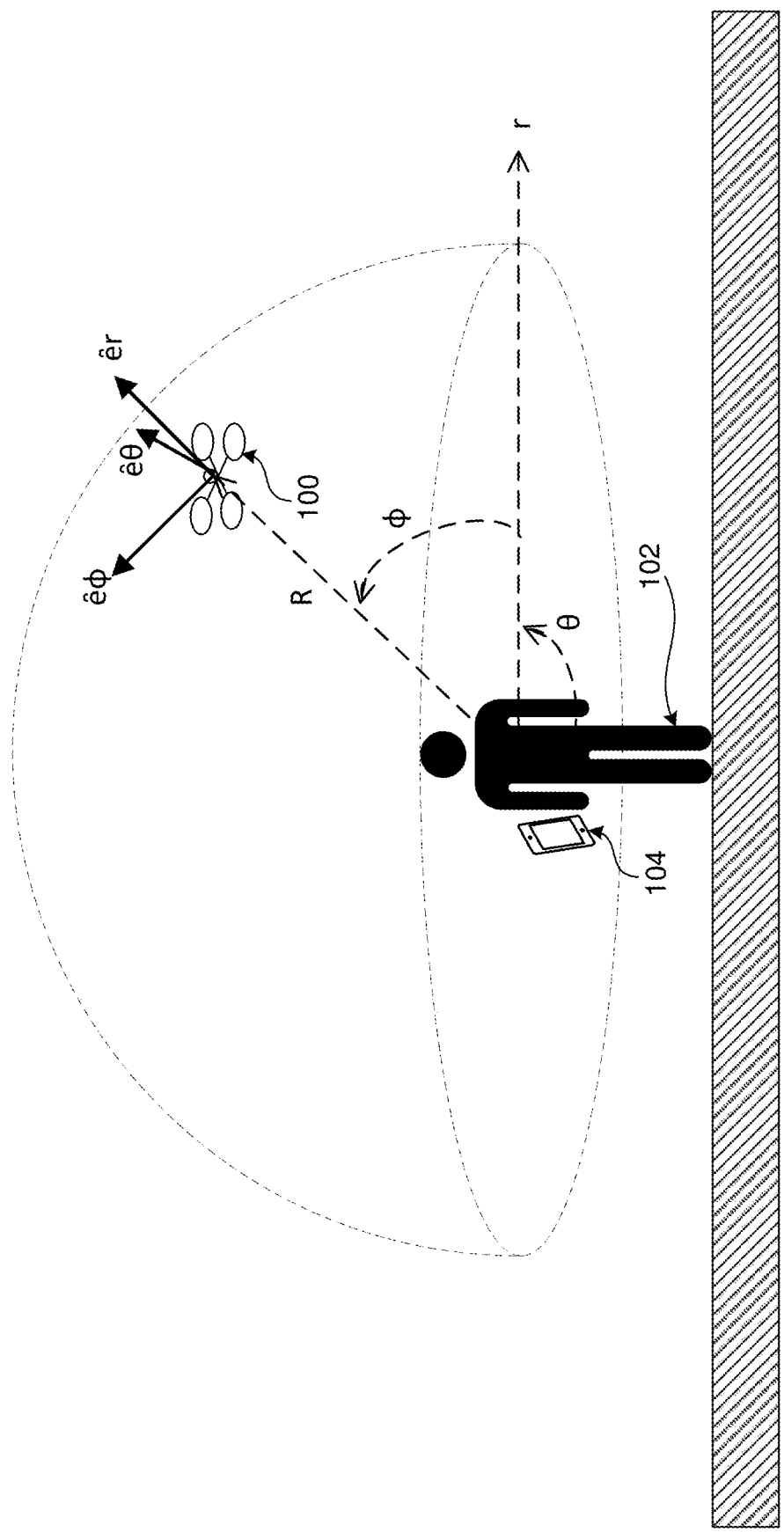

FIGS. 8D and 8E Illustrate at a high level how the motion of an FDA 100 controlled by the "magic wand" technique may be calculated and/or described according to different coordinate systems.

In FIG. 8D, an FDA 100 is be configured to maneuver according to a cylindrical polar coordinate system relative to a point of reference, for example the user 102 or PMD 104 held by the user. In such a configuration, a sweeping gesture (e.g., similar to that described with reference to FIG. 8A) by the user 102 with the PMD 104, may cause the FDA 100 to move along the normal tangent to an axial direction z. In other words, the sweeping gestures by the user 102 may cause the FDA 100 to accelerate along basis directions êz and êθ, with no acceleration in the basis direction êr. Accordingly, in response to sweeping gesture inputs by user 102, FDA 100 may travel along an invisible cylindrical plane at a constant radius R from user 102. Similarly, the user may provide an input to accelerate the FDA 100 along basis direction êr while maintaining constant positions z and θ. For example, as previously described, a user 102 (while holding the button down on a touch screen display of a PMD 104) may slide their finger up or down. This may correspond to an acceleration by FDA 100 in the basis direction êr.

Similarly, as shown in FIG. 8E, an FDA 100 may be configured to maneuver according to a spherical polar coordinate system. Similar to the example illustrated in FIG. 8D, a sweeping gesture by user 102 with the PMD 104 may cause the FDA 100 to accelerate along basis directions êφ and êθ, with no acceleration in basis direction êr. Accordingly, in response to sweeping gesture inputs by user 102, FDA 100 may travel along an invisible spherical plane at a constant radius R from user 102. Also similarly, swiping up or down motion on the touch screen display of PMD 104 may cause FDA 100 to accelerate in basis direction êr.

Calculations for the motion of the FDA 100 in the above described control configurations may be accomplished using relative or absolute coordinate system of any type (Cartesian, polar, cylindrical, etc.), although motion calculations based on an absolute coordinate system may be more processor intensive than if made relative to point of reference (e.g., user 102 or PMD 104). The cylindrical and polar coordinate systems are used here for illustrative purposes to describe more clearly the way in which the FDA 100 may move relative to a reference point (e.g., the user 102 or PMD 104) using the above described "magic wand" technique.

According to some embodiments, calculation of maneuvers to be performed by the FDA 100 may include implementation of a feed-forward control scheme. For example, consider again user 102 controlling FDA 100 via a PMD 104 (as shown in FIGS. 8A-8E). As user 102 begins to gesture using PMD 104, the gesture may be recognized based on historical model of user gestures. Here, the recognized gesture may correspond to a predicted trajectory and stop point for FDA 100. Accordingly, as an illustrative example, FDA 100 may begin a maneuver and midpoint along a predicted path, begin maneuvering to return to a hover. This will allow for smoother transitions between flight maneuvers.

While in flight, the FDA 100 may capture images and or video using one or more on board optical sensors. In some embodiments, image capture may track the same point of reference used for calculating motion. Consider an example in which the user 102 is the point of reference. Here, the FDA 100 may maneuver around the user 102 in response to gestures made by the user 102 with the PMD 104, as described above. Similarly, while moving around the point of reference (i.e., the user 102), the FDA 100 may adjust the orientation and/or processing of image capture device(s) (e.g., optical sensors) such that the point of reference (i.e., the user 102) remains centered in the field of view of the image capture device(s). Image capture may be adjusted according to techniques previously described, for example, a mechanical and/or a hybrid mechanical gimbal system linked to one or more cameras.

Thrown FDA—A User Interaction Paradigm

Figure 9:
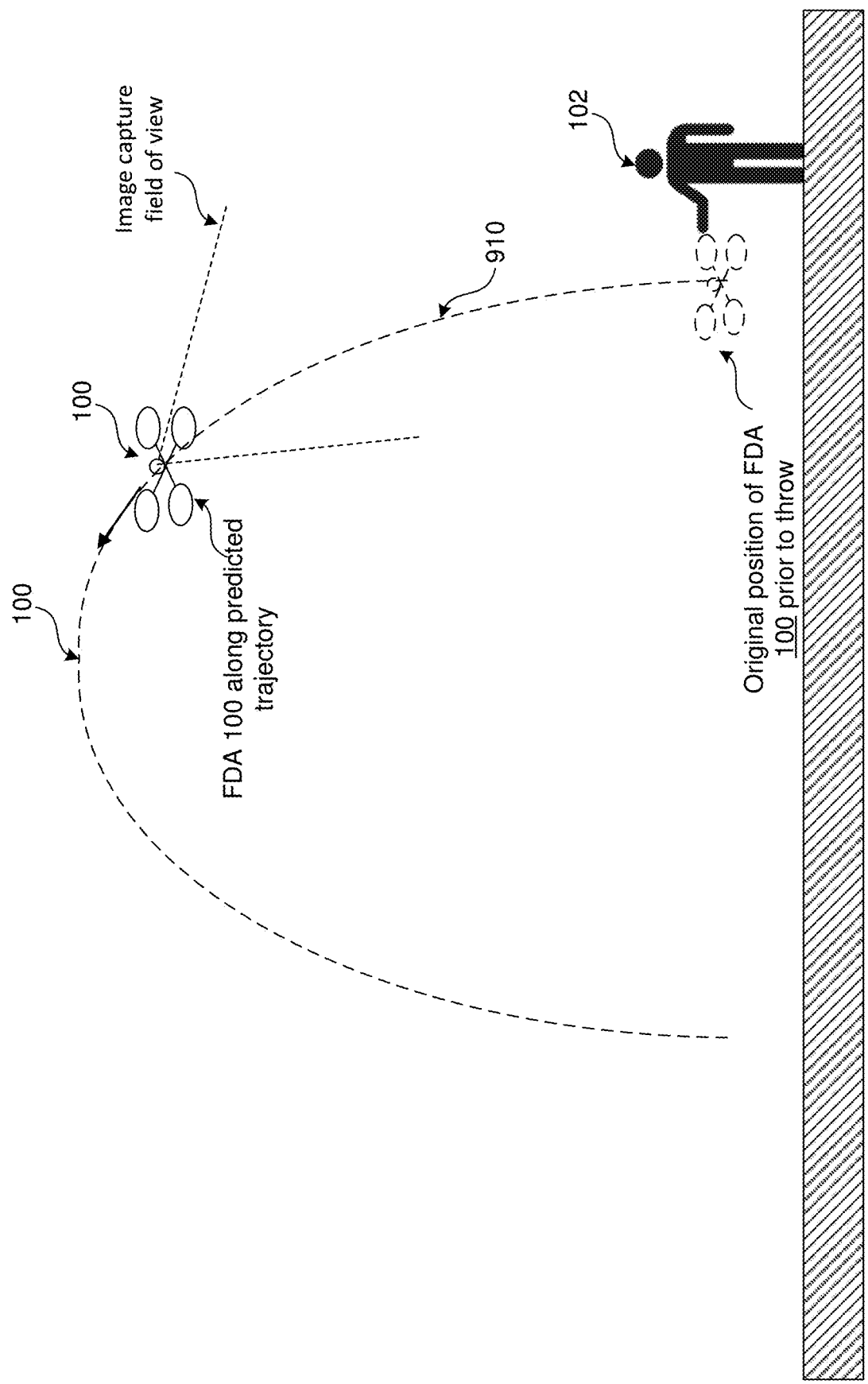
FIG. 9 illustrates an example processes of a thrown FDA, according to some embodiments.

According to some embodiments, a user may be able to throw an FDA 100 up in to the air to a desired point in order to capture an aerial photograph or aerial video. FIG. 9 shows a high-level illustration of the concept of a thrown FDA 100. For example, a ski photographer (e.g., user 102 in FIG. 9) may wish to pre-position an FDA 25 feet of the ground near a particular jump in order to capture an interesting angle of skiers flying off the jump. Using an FDA 100 according to the present teachings, the photographer may carry the FDA to the location of the jump and throw the FDA 100 in the air with sufficient strength such that the FDA may reach a height of 25 feet. As the photographer begins her throw, sensors within the device (e.g., IMU, accelerometer, gyroscope, camera, etc.) may sense a change in orientation and/or position (e.g., a liner or angular acceleration) tending to indicate a beginning of a throw. Having sensed the beginning of the throw, a processor or processors (at the FDA 100 or an associated computing device (e.g., a PMD 104) (not shown) may analyze the motion data captured by the sensors and determine a predicted trajectory (represented in FIG. 9 by dotted parabolic curve 910) of the throw relative to a reference point. According to some embodiments, the reference point may be a global absolute origin point, the current position of the FDA 100, a user 102 or tracked target, or a PMD 104. As the photographer continues through her throwing motion, the processor(s) may update the predicted trajectory up until the sensors detect that the photographer has released the FDA. Trajectory predictions may be based on a number of factors including, but not limited to the force of gravity, current atmospheric pressure, current wind, and any other factors that may impact trajectory calculations. Processor(s) may then determine a set of aerial maneuvers necessary such that the FDA 100 may actively fly to a point along the predicted trajectory (e.g., apex 920), stop, hold its position in hover, turn around and begin capturing images. In some embodiments, an FDA 100 may be configured to focus on the point of reference (e.g., the user 102, or the position of FDA 100 at the start of the throw) for image capture. Alternatively, a point of reference may be defined by a user 102 via a PMD 104. For example, a user may select a point of reference on a map displayed via a touch screen display of a PMD 104. Once thrown, the FDA 100 will travel to a point along the trajectory (e.g., apex 920), enter a controlled hover and target the reference point set by user 102 via the map, and begin image capture.

According to some embodiments, a predicted trajectory may be "amplified" or "transformed" thereby allowing a throwing motion to translate to an altitude physically unattainable by a human throw. For example, a photographer at a concert may wish to throw an FDA 100 several hundred feet in the air in order to capture an image of the entre crowd at the concert. Instead of predicting a trajectory and associated apex based on a human throw, the processor(s) may apply an amplifying multiplier to the predicted trajectory such that a "strong" throw by a human corresponds to an apex located several hundred feet in the air.

According to some embodiments, once the FDA 100 has reached the set point along the predicted trajectory it may begin filming immediately. Conversely, the FDA 100 may hold its set position awaiting further input from user 102 to capture an image/video. According to some embodiments the FDA 100 may track the position of the user or another subject after the throw and follow that user or other subject while holding a constant altitude. According to some embodiments the FDA 100, having acquired a subject to follow, may execute a preset flight pattern, for example orbiting around the subject while following at a constant altitude.

Scripted Shots—A User Interaction Paradigm

According to some embodiments, shots may be "scripted" by a user by physically carrying an FDA 100 or PMD 104 through a scene prior to capturing images and/or video. For example, a cinematographer may wish to "script" a shot including a low pass by a human subject. The cinematographer may pick up the FDA 100, and after activating a scripted shot mode, may carry the FDA 100 past the human subject thereby mimicking the shot that the cinematographer wishes to capture. While in a scripted shot mode, the FDA 100 may track and store data associated with its relative position and/or orientation (e.g., via the techniques for localization as previously described in more detail). According to some embodiments the position and/or orientation of the FDA 100 may be tracked relative to a point of reference (e.g., a stationary PMD 104). Once a path of motion is tracked and stored, the FDA 100 may be configured to automatically retrace the stored path and recapture the same shot multiple times. For example, scripted shots as disclosed may take the place of track-based camera dolly on the set of a movie. Multiple takes of the same shot may be attempted using the exact same camera movement each time. Further, an airborne FDA 100 allows for greater flexibility in the types of shots attempted.

Shots may also be "scripted" by a user 102 by physically moving a PMD 104 over a scale representation of a scene.

Figure 10A:
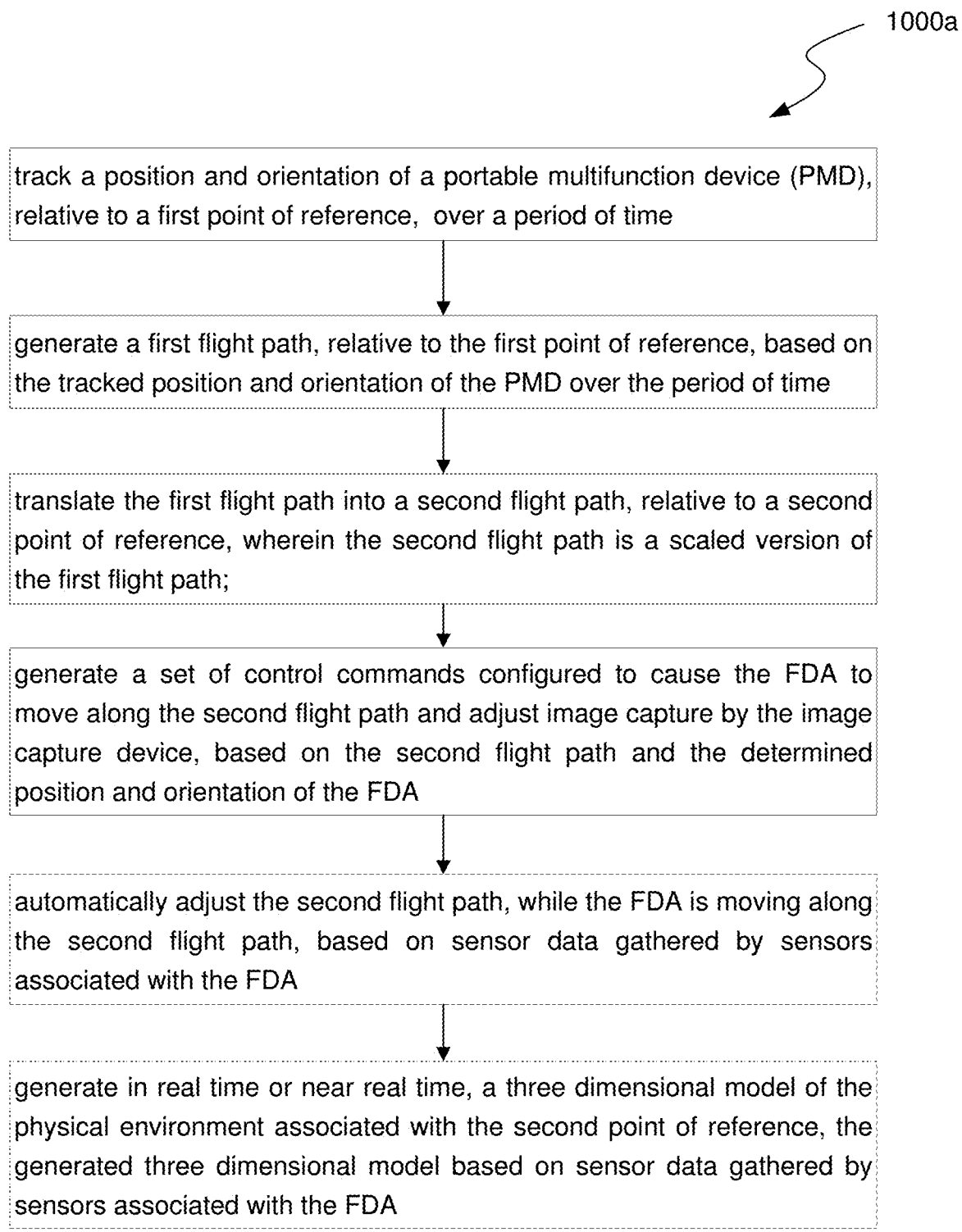
FIG. 10A is a flow chart describing an example process for scripting a shot using an FDA, according to some embodiments.

FIG. 10A shows a flow chart illustrating an example method 1000a of scripting a shot using an FDA 100.

Figure 10B:
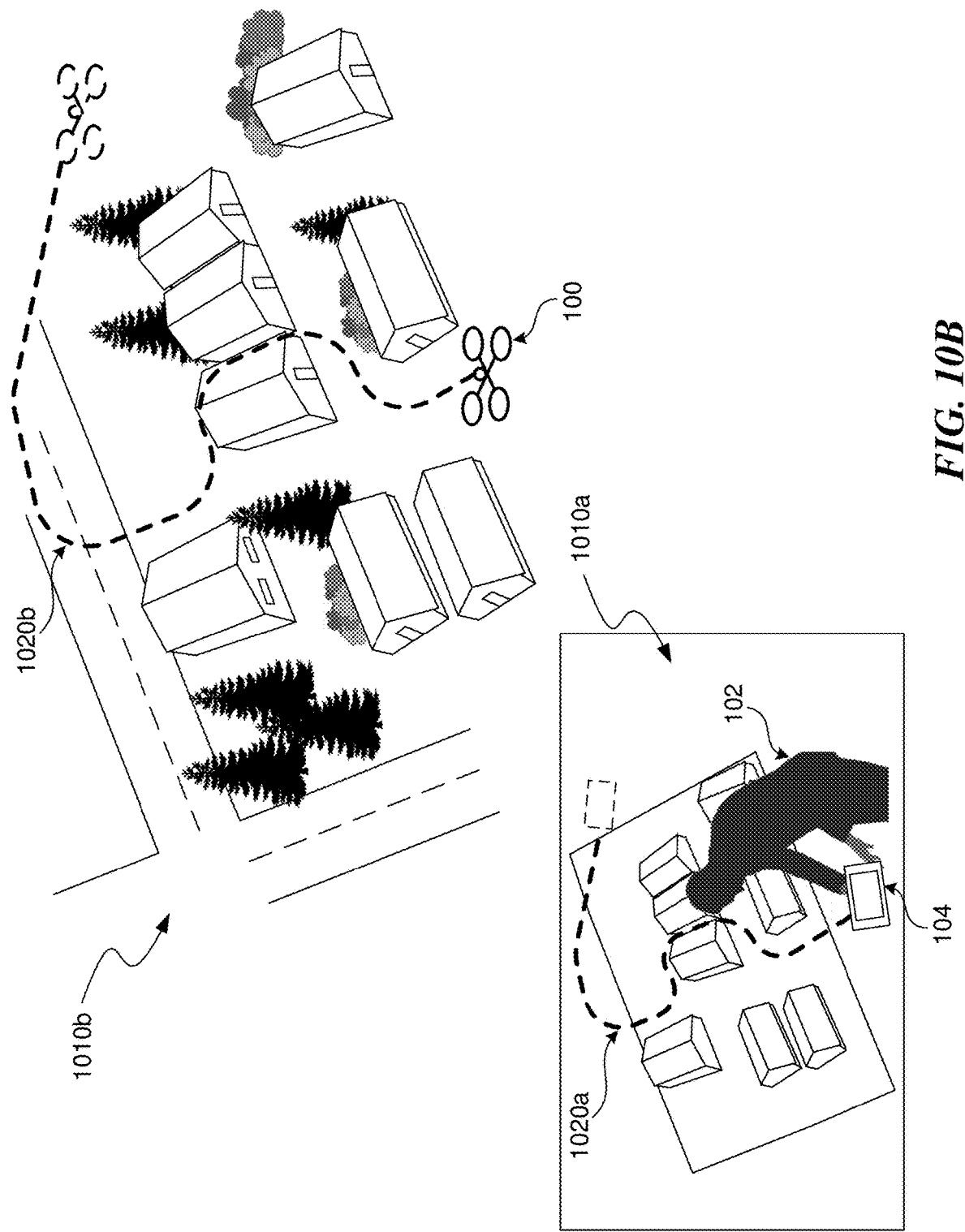
FIG. 10B illustrates a "scripted shot" paradigm for user interaction with an FDA, according to some embodiments.

FIG. 10B illustrates an example process, for example similar to that described with reference to FIG. 10A, of scripting a shot by an FDA 100 using a PMD 104. As an example, a user 102 may wish to "script" a shot including a high pass over landscape scene. The previously described method of scripting shots may not work in this instance because the user 102 may not be able to physically carry the FDA 100 to the height he wishes it to travel in the scripted shot. Instead, the cinematographer, using a PMD 104 may script the shot by moving the PMD 104 over a scale representation of the scene (in some cases just a surface) such that the motion of the PMD 104 may mimic a scaled version of the desired motion of the FDA 100. For example, as shown in FIG. 10, a user 102 may move PMD 104 through a scale model 1010a of a scene.

As PMD 104 moves through the scale model 1010a, data regarding position and/or orientation along a path 1020a (represented by the dotted line in FIG. 10) is stored. Motion data may be captured by a number of sensors onboard PMD 104, including but not limited to a camera and internal motion sensors (IMU, accelerometer, gyroscope, etc.), or by using any of the other methods previously described. According to some embodiments the position and/or orientation of the PMD may be tracked relative to a point of reference. For example, a sticker with a AR tag may be placed on the surface representing a stationary point from which to track relative position and/or orientation. The motion data gathered by PMD 104 may be analyzed and transformed or translated (e.g., by processors at PMD 104, FDA 100, or another computer device (not shown)) into a scaled second flight path or motion data or sets of commands configured to provide for automated flight of FDA 100 through the actual scene 1010*b* along a scaled version 1020*b* of original path 1020*a*. The FDA 100 may be configured to automatically retrace path 1020*b* and recapture the same shot multiple times. For example, data associated with the stored path may be transmitted by the PMD 104 to the FDA 100 wirelessly (e.g., via Wi-Fi).

As shown in FIG. 10, while a path 1020*a* may be scaled to path 1020*b*, without much issue, FDA 100 may still need to make automated adjustments mid-flight to avoid obstacles not considered in the scale shot. For example, as shown in FIG. 10, scaled model 1010*a* does not include the trees as shown in actual scene 1010*b*. Using techniques of localization and navigation previously described, FDA 100 may automatically detect obstacles mid-flight and make appropriate adjustments to the path 1020*b*.

Scripted shots, as described above, may be shared between users via an online system. The motions associated with these scripted shots can then be performed by pressing a button on the user's PMD.

Preset Flying Patterns—A User Interaction Paradigm

Figure 11:
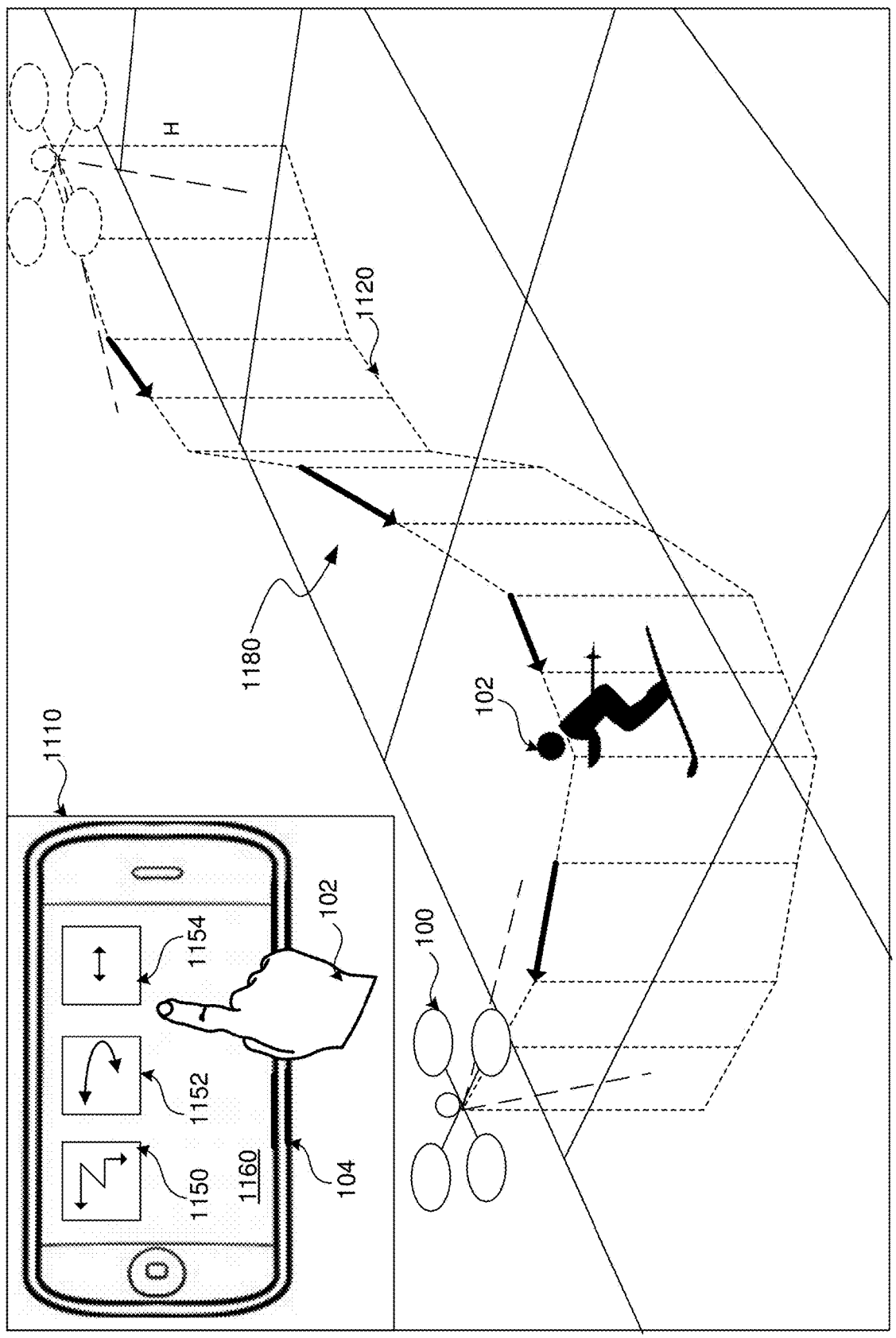
FIG. 11 illustrates a "preset patterns" paradigm for user interaction with an FDA, according to some embodiments.

According to some embodiments, a user 102 may select preset flying patterns for the FDA 100 to fly via a user interface on a PMD 104. For example, consider a skier (user 102) that wishes to film their run down a mountain as shown in FIG. 11. Because the skier 102 will be concentrating on their skiing, they may not have the ability to actively control the FDA 100 while going down the mountain. Instead, using a PMD 104, the user 102 may select from a number of preset flight and filming patterns before beginning their run. For example, as shown in detail 1110 in FIG. 11, a number of selectable preset flying patters 1150-1154 may be displayed, for example via a touch screen interface 1160 of PMD 104 Using the localization and navigation techniques as disclosed earlier, the FDA may autonomously track the skier down the mountain according to a certain flight pattern while filming at the same time. For example, the FDA may be preset to track the skier down the mountain while orbiting at a constant distance. As another example, the FDA may be preset to fly a choreographed pattern in relation to a point of reference including dramatic fly-bys, pullouts and zooms. As an example, the point of reference may be defined with respect to user 102 and/or PMD 104. As shown in FIG. 11, in response to a selection of a preset pattern (e.g., one of 1150-1154), FDA 100 may fly a preset pattern as represented by route 1120. The route 1120 may be defined with respect to a moving point of reference such as skier 102. Further, according to some embodiments, while flying autonomously according to the preset pattern, FDA may maintain a constant altitude H with relation to the ground, for example as represented by plane 1180.

As another example, the FDA 100, using computer vision and artificial intelligence algorithms may respond to the scenes as they unfold and select from a number of preset flight and filming routines, or fly customized flight patterns, in order to capture a unique and exciting series of shots.

According to some embodiments, the FDA 100 may respond to information gathered from the environment in order to update or adjust its flight pattern. For example, although preset to fly and orbiting pattern, the FDA 100 may nevertheless slightly adjust its pattern at times such that minimizes the number of shots pointed directly at the sun.

Multi-Touch Cinematographer—A User Interaction Paradigm

According to some embodiments a user 102 may control an FDA 100 (and image capture via an FDA 100) using "multitouch" gestures applied to a touch screen on a PMD 104. A number of currently available map apps for mobile devices allow for navigation within a 2D or 3D (rendered or satellite image-based) map using predefined "multitouch" gestures, for example Google® Maps. Similarly, an FDA 100 may be configured to move and capture images and/or video that mimics the experience of interacting with a satellite map via multitouch based map app. Consider an example of an FDA 100 hovering directly overhead a user 102 controlling the FDA 100 via a touch screen PMD 104. The user's PMD 104 may display the video captured by the FDA 100 in real time. The captured video may be streamed directly from the FDA 100 to the PMD 104 via a wireless RF signal (e.g., Wi-Fi). The user 102 may view on the screen of the PMD 104, video streamed from the FDA 100. In an alternative embodiment, sensor data gathered at the FDA 100 may be used to generate a 3D model of the surrounding physical area in real time (or near real time). For example, an FDA 100 equipped with LIDAR may use laser scanning to generate a 3D model of the surrounding space in real time or near real time. Similarly, an FDA 100 using computer vision and visual odometry techniques (previously discussed) may generate a 3D model of the surrounding area in real time or near real time. In such an embodiment, instead of streaming a live video feed from a standard camera, the FDA 100 may stream "live" renderings of the computer generated model from the point of view of a virtual camera in the space, wherein the position and/or orientation of the virtual camera in the virtual space of the generated model corresponds with the position and/or orientation of the FDA 100 in actual physical space, at any given moment. This approach may be used to minimize the delay time between a multitouch gesture input by a user 102 and the time it would take the FDA 100 to fly to a position and/or orientation defined by the gesture input. In other words, as a user 102 makes the gesture input via PMD 104, the virtual camera would make the corresponding adjustment within the 3D model in real time or near real time. The FDA 100 may take several more seconds to physically arrive at the indicated position/orientation due to physical limitations (e.g., the speed of the FDA, zoom capabilities of the actual camera).

Figure 12A:
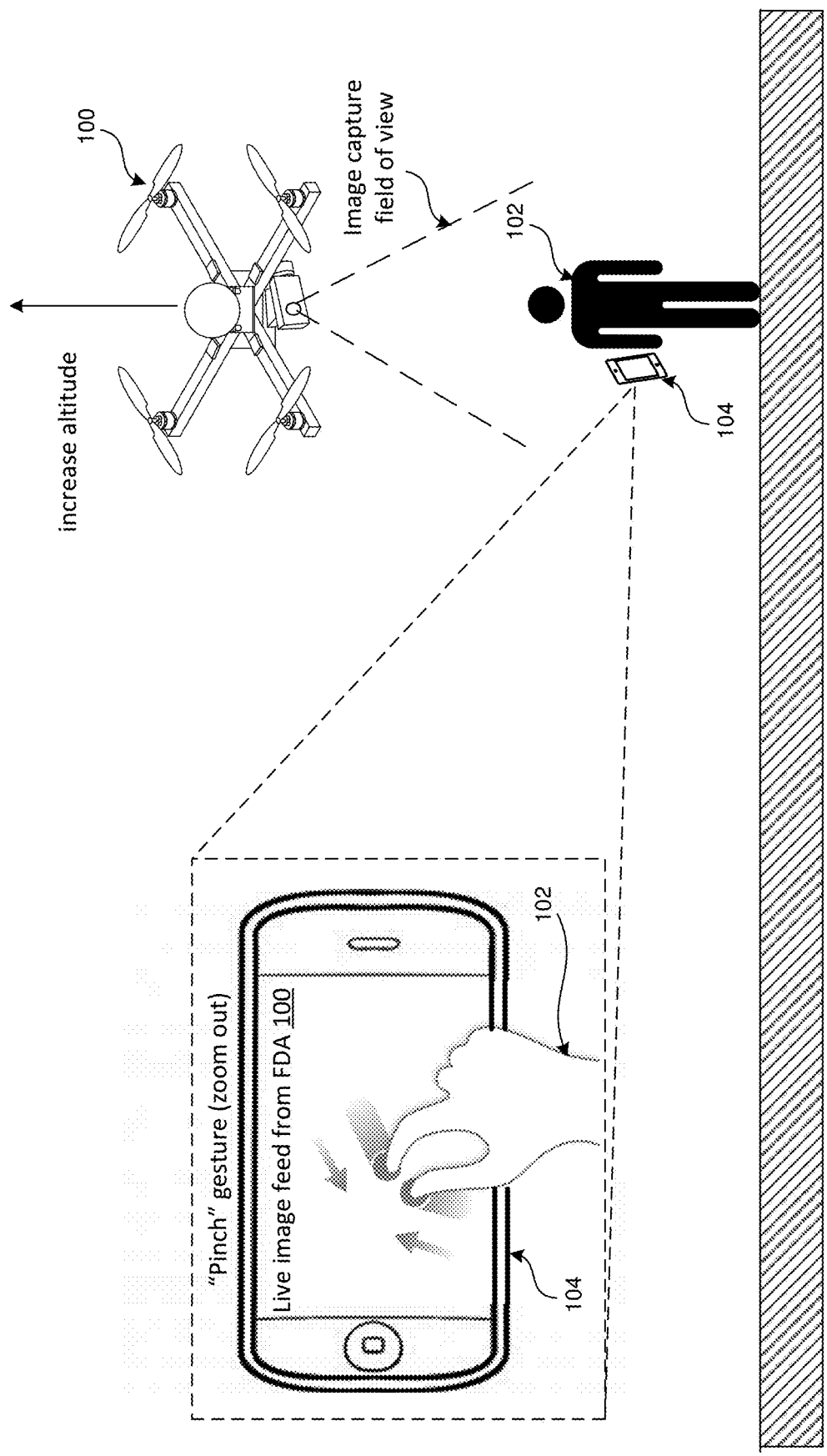
FIGS. 12A-12D illustrate a "multitouch cinematographer" paradigm for user interaction with an FDA, according to some embodiments.
Figure 12B:
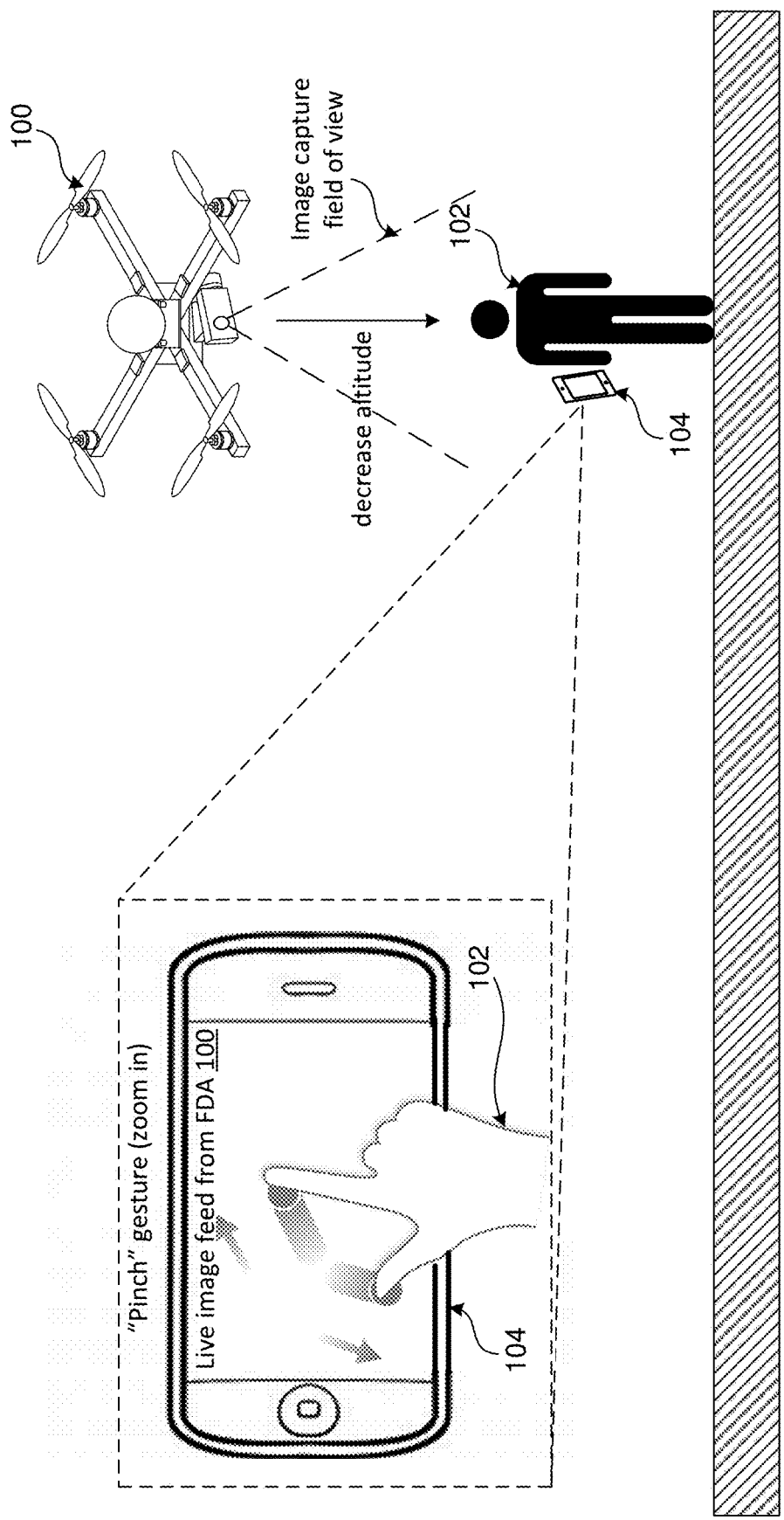

As illustrated in FIGS. 12A-12D, using predefined multitouch gestures, the user 102 may control the FDA 100 and video captured by the FDA 100. For example, as illustrated in FIGS. 12A-12B, in order to zoom in or out," the user 102 may apply a "pinch to zoom" gesture using two fingers. This pinch to zoom gesture may cause the FDA 100 to adjust its altitude and/or the image capture device to adjust its focal length (i.e., optically zoom), and/or a digital image processor to adjust the captured image (i.e., digital zoom).

Figure 12C:
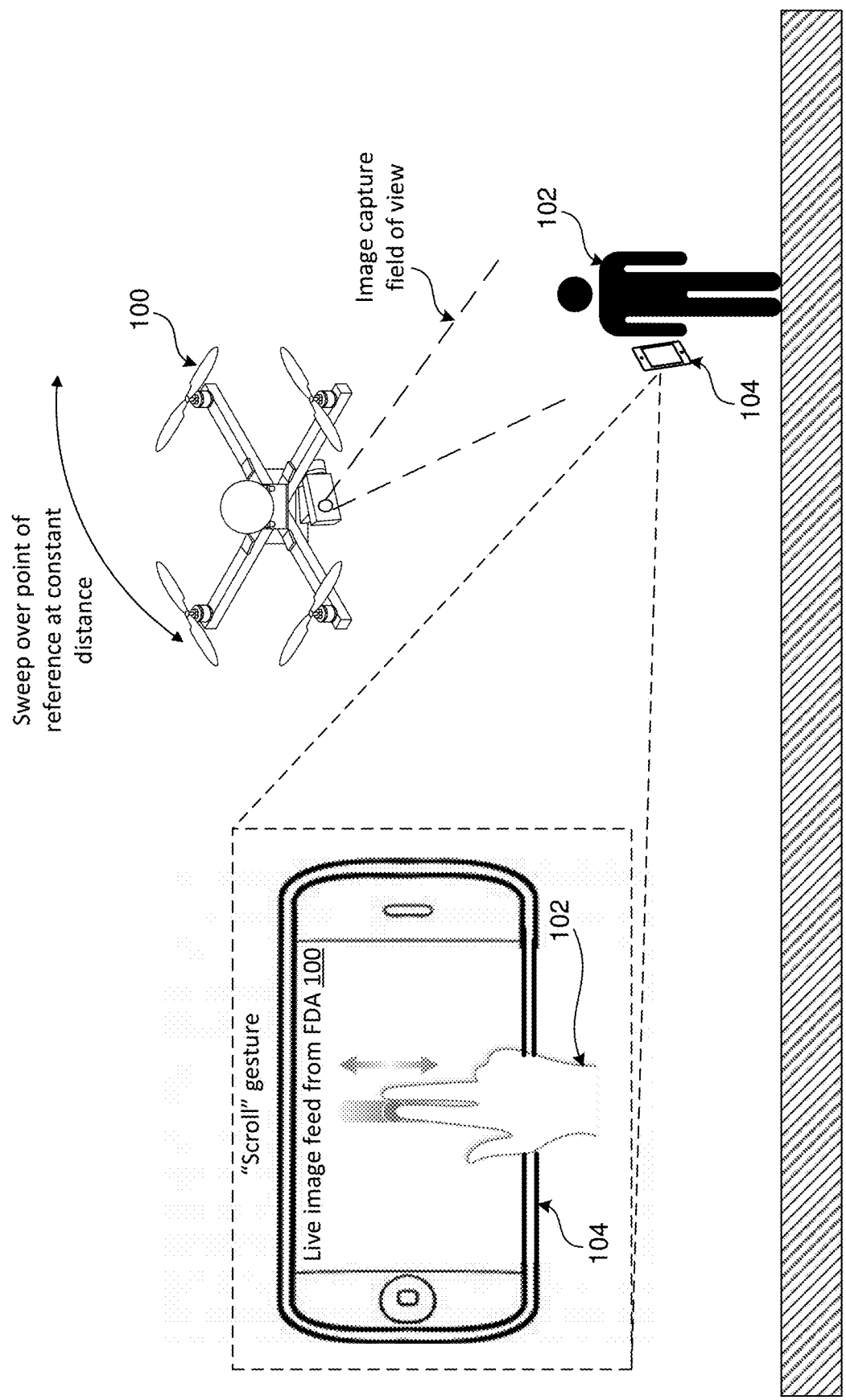

As illustrated in FIG. 12C, the user 102 may drop the FDA 100 to a lower altitude and off to the side of the user by applying a "two-finger scroll" gesture, as shown in FIG. 12C. This gesture may cause the FDA 100 to "sweep over" a point of reference (e.g., user 102 or PMD 104) while maintaining a constant relative distance to the point of reference and while keeping the point of reference centered in the view of the image capture device (e.g., via hybrid mechanical digital gimbal as described in more detail earlier). Described differently, with reference to FIG. 8E, a two finger scroll gesture may cause acceleration in basis direction $\hat{e}\varphi$ and or $\hat{e}\theta$, while maintaining distance R to the point of reference (i.e., zero acceleration in basis direction $\hat{e}r$).

Figure 12D:
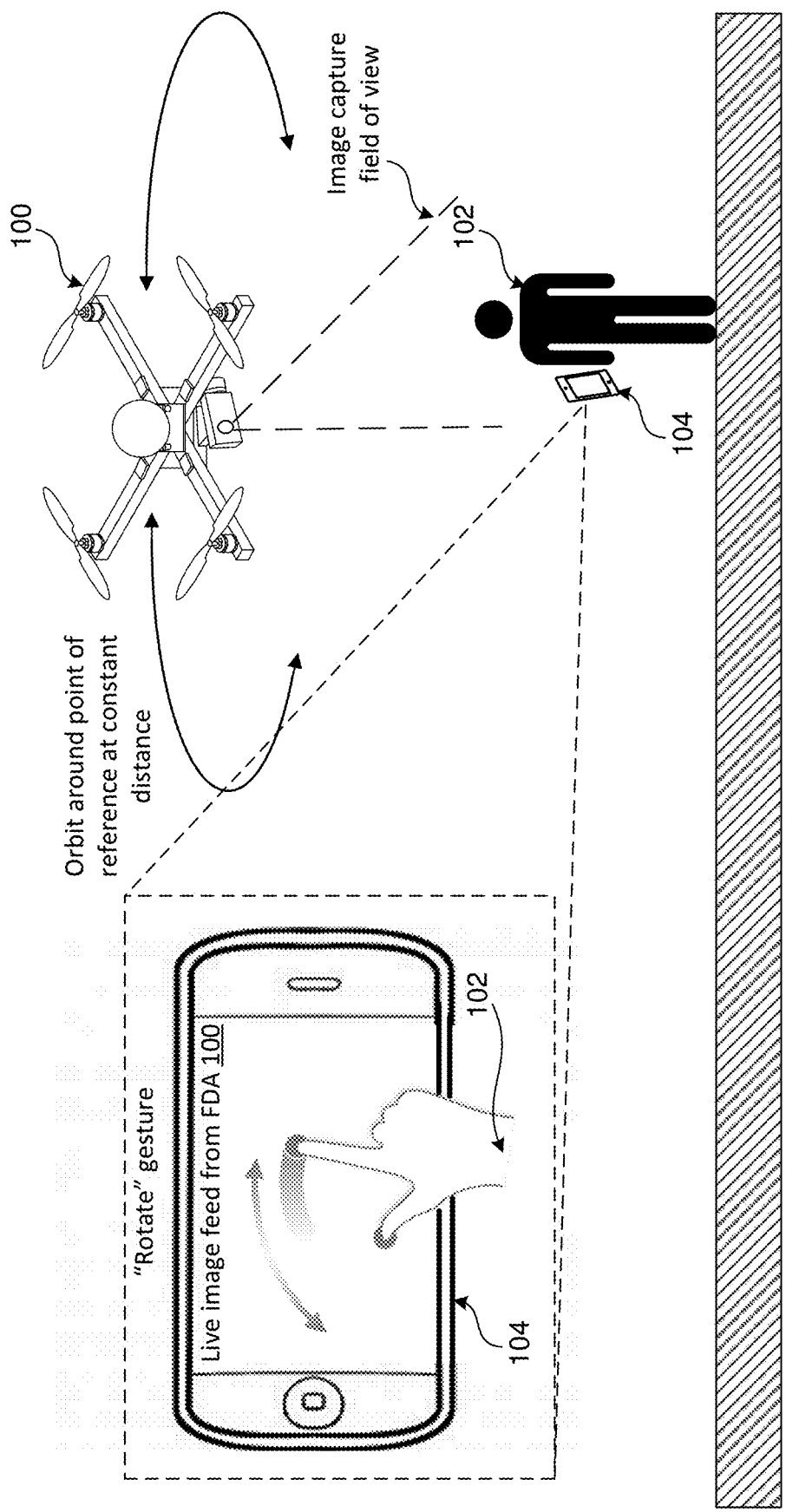

As illustrated in FIG. 12D, the user 102 may rotate the captured video by applying a two-finger gesture in a clockwise or counter clockwise direction. This gesture may cause the FDA 100 to orbit around a point of reference (e.g., user 102 or PMD 104), while maintaining a constant distance or altitude. Described differently, with reference to FIG. 8D, a two finger rotate gesture may cause acceleration in basis direction $\hat{e}\theta$, while maintaining distance R to vertical axis z or another point of reference (i.e., zero acceleration in basis directions $\hat{e}r$ and $\hat{e}z$).

Further, the user 102 may perform more complicated maneuvers with the FDA 100, all while staying in the centered in the view of the image capture device by applying a two-finger gesture in which one finger remains stationary and another finger pans around the screen.

According to some embodiments the image displayed on the PMD 104 may be a rendered 3D representation of the scene including the position of user 102, as described earlier. In other words, image capture may be controlled via multitouch interaction with a rendered 3D map of the actual location.

The above described embodiments present only a few examples of the multitouch cinematographer user interaction paradigm. Any number of predefined multitouch gestures may be configured to control image capture by an FDA 100.

Automatic Highlight Reel—A User Interaction Paradigm

According to some embodiments a highlight reel may be generated after every flight by the FDA 100. The highlight reel may incorporate audio, images, and/or video captured during the flight as well as pre-recorded audio, images and/or video, and pre-rendered graphics. According to some embodiments, the highlight reel may be composed automatically based on preset user settings, group settings, or artificial intelligence algorithms. According to some embodiments, a user may "tag" certain events for incorporation into a automatically composed highlight reel, by for example tapping or shaking their PMD 104 while the FDA 100 is in flight and capturing images and/or video.

According to some embodiments, a highlight reel may be composed using combinations of software and/or hardware instantiated on an FDA 100, PMD 104, remote computing device (e.g., a remote server) or any combination thereof. For example, according to some embodiments the FDA 100 may capture audio, images and/or video and store them to local memory (e.g., a flash solid state drive). The FDA 100 may further receive "tagging" inputs transmitted by the user via a PMD (e.g via a wireless RF signal). The FDA 100 may analyze the captured audio, images and/or video and automatically compose a highlight reel. If necessary, the FDA 100 may download pre-recorded audio, images and/or video from a remote computing device (e.g., via a content distribution network) and incorporate the pre-recorded audio, images and/or video into the highlight reel.

Automatic Music Video—A User Interaction Paradigm

According to some embodiments a music video may automatically be generated. For example, while capturing images and/or video, the FDA 100 may stream music to the user's PMD 104 via a wireless connection (e.g., via RF signals). The PMD 104 may playback the streamed music to the user and receive inputs from the user to control the image/video capture by the FDA in synch with the streamed music. As in the previous user interaction paradigm titled "Automatic Highlight Reel," a music video may automatically be generated using the best captured images and/or video in synch with the selected music. For example, composition may be guided by synchronizing cuts in the video with beats in the selected music. In some embodiments, the FDA may automatically adjust its motion and associated image capture to best match the music. For example, the FDA may automatically adjust flight patterns and image capture to match the characteristics of the music. As illustrative examples, the FDA may automatically increase speed as the tempo of the music increases, automatically perform a dramatic sweep flying pattern at a climactic point in the musical piece, adjust visual filters applied to captured images at transitions between segments of a musical piece, etc.

As with the automatic highlight reel, a music video may be composed using combinations of software and/or hardware instantiated on an FDA 100, PMD 104, remote computing device (e.g., a remote server) or any combination thereof. For example, according to some embodiments the FDA 100 may capture video and store it to local memory (e.g., a flash solid state drive). The FDA 100 may further receive "tagging" inputs transmitted by the user via a PMD 104 (e.g., via a wireless RF signal). The FDA 100 may analyze the captured video and the music to be associated with the music video and automatically compose a music video. If necessary, the FDA 100 may download pre-recorded audio, images and/or video from a remote computing device (e.g., via a content distribution network) and incorporate the pre-recorded audio, images and/or video into the music video.

Distributed Audio Capture—A User Interaction Paradigm

According to some embodiments, audio may be captured by both the FDA 104 and user's PMD 104, or any number of other electronic devices. For example, while capturing images and/or video, and FDA 100 may also capture audio (e.g., via a microphone). However, while in flight, audio captured by the FDA 100 may be of relatively low quality. Therefore, audio may also be captured via microphones embedded in the user's PMD 104 or other electronic devices and synchronized with the images/video captured by the FDA 100. According to some embodiments, audio may be captured by multiple devices with microphones in the area. For example, a user 102 may capture video via an FDA 100, audio via their PMD 104, and may further capture audio from a distributed network of additional PMDs or other electronic devices in close proximity to the PMD 104. Audio captured by the additional PMDs may be streamed to the user's PMD 104 via wireless signal (e.g., Bluetooth).

Synchronization between the captured audio and captured video may be performed in real time or in post-production an using combinations of software and/or hardware instantiated on an FDA 100, user's PMD 104, remote computing device (e.g., a remote server), or any combination thereof.

Flying Tablet—A User Interaction Paradigm

According to some embodiments, an FDA 100 may include a touch screen display and may present the display in the direction of a user 102 while capturing images and/or video while tracking the user. For example, while skiing down a mountain, a skier may wish to capture video of themselves using an FDA 100 according to the present teaching. The FDA 100 may track the skier and follow them down the mountain. The FDA 100 may at all times present a touch screen display in the direction of the skier, such that the skier may view the video as is it is captured.

According to some embodiments the FDA 100 may maintain a constant position and orientation relative to a point of reference (e.g., user 102 or a PMD 104). According to some embodiments, the FDA 100 may move around the user according to preset pattern, for example revolving around the user as user moves, or as described with reference to FIG. 11. The FDA 100 may move autonomously in order to track the skier or may respond to control inputs (e.g., via a PMD 104). Control may be according to the "magic wand" technique previously described.

According to some embodiments the touch screen display may be separate product (e.g., a PMD such as an iPad®) that is functionally coupled to an FDA 100.

Multiple Subject Filming—A User Interaction Paradigm

According to some embodiments, an FDA 100 may be connected to multiple PMDs on a wireless network and may capture images/video of multiple subjects. For example, consider a FDA 100 hovering over an outdoor event. Any person attending the event with a compatible PMD may connect to the wireless network to which the FDA 100 is connected and request to be filmed via the user interface on their respective PMD. The FDA 100, having identified the relative location and/or orientation of the requesting user's PMD, may maneuver to capture images and/or video of the user while tracking the user. According to some embodiments, requesting users may be charged a fee (e.g., a subscription or one-time fee) for requesting temporary use of the FDA 100. According to some embodiments, a director user may identify subjects to track and film.

Flight Time Tied to Battery Life/Recording time—A User Interaction Paradigm

According to some embodiments, the FDA 100 may capture video at all times while in flight. According to some embodiments, the PMD 104 may report to the user (through a user interface) flight time remaining as the lesser of recording time left and battery flight time left. According to some embodiments, the FDA 100 may automatically land immediately before the battery runs out. According to some embodiments, the FDA 100 may land immediately before storage space (e.g., for captured video) runs out.

Background on a Flying Digital Assistant

An FDA 100 may be implemented as an Unmanned Aerial Vehicle (UAV), according to some embodiments. An Unmanned Aerial Vehicle (UAV), sometimes referred to as a drone, is generally defined as any aircraft capable of controlled flight without a human pilot onboard. UAVs may be controlled autonomously by onboard computer processors and/or via remote control by a remotely located human pilot. Similar to an airplane, UAVs may utilize fixed aerodynamic surfaces along means for propulsion (e.g., propeller, jet, etc.) to achieve lift. Alternatively, similar to helicopters, UAVs may directly use their means for propulsion (e.g., propeller, jet) to counter gravitational forces and achieve lift. Propulsion-driven lift (as in the case of helicopters) offers significant advantages in certain implementations, for example as a mobile filming platform, because it allows for controlled motion along all axes.

Multi-rotor helicopters, in particular quadcopters, have emerged as a popular UAV configuration. A quadcopter (also known as a quadrotor helicopter or quadrotor) is a multirotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, the first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors but in a balanced fashion such that lift is increased on one side of the craft and decreased on the other side of the craft. An adjustment in altitude from hover may be induced by applying a balanced variation in all four rotors thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will therefore accelerate the craft forward on horizontal plane.

FIG. 13 is a high-level diagram illustrating various components of an example FDA 100, according to some embodiments. The FDA 100 may include one or more means for propulsion (e.g., rotors 1302 and motor(s) 1304), one or more electronic speed controllers 1306, a flight controller 1308, a peripheral interface 1310, a processor(s) 1312, a memory controller 1314, a memory 1316 (which may include one or more computer readable storage mediums), a power module 1318, a GPS module 1320, a communications interface 1322, an audio circuitry 1324, an accelerometer 1326 (including subcomponents such as gyroscopes), an inertial measurement unit (IMU) 1328, a proximity sensor 1330, an optical sensor controller 1332 and associated optical sensor(s) 1334, a PMD interface controller 1336 with associated interface device(s) 1338, and any other input controllers 1340 and input device 1342, for example display controllers with associated display device(s). General terms such as "sensors" may refer to one or more components or combinations of components, for example, microphone 1324, proximity sensors 1330, accelerometers 1326, IMU 1328, optical sensors 1334, and any combination thereof. These components may communicate over one or more communication buses or signal lines as represented by the arrows in FIG. 13. As mentioned earlier, piloting input may be provided wirelessly by a user 102 on the ground or in another vehicle via remote control or portable multi-function device 104.

FDA 100 is only one example of an FDA. FDA 100 may have more or fewer components than shown, may combine two or more components as functional units, or a may have a different configuration or arrangement of the components.

Some of the various components shown in FIG. 13 may be implemented in hardware, software or a combination of both hardware and software, including one or more signal processing and/or application specific integrated circuits. Also, FDA 100 may include an off-the-shelf UAV coupled with a modular add-on device (for example one including components within outline 1390).

As described earlier, the means for propulsion 1302-1306 may comprise a fixed-pitch rotor. The means for propulsion may also be a variable-pitch rotor (for example, using a gimbal mechanism), a variable-pitch jet engine, or any other mode of propulsion having the effect of providing force. The means for propulsion 1302-1306 may include a means for varying the applied thrust, for example via an electronic speed controller 1306 varying the speed of each fixed-pitch rotor.

Flight Controller 1308 (sometimes referred to as a "flight control system" or "autopilot") may include a combination of hardware and/or software configured to receive input data (e.g., input control commands from a PMD 104 or other sources), interpret the data and output control signals to the propulsion systems 1302-1306 and/or aerodynamic surfaces (e.g., fixed wing control surfaces) of the FDA 100.

Memory 1316 may include high-speed random-access memory and may also include non-volatile memory, such as one or more magnetic disk storage devices, flash memory devices, or other non-volatile solid-state memory devices. Access to memory 1316 by other components of FDA 100, such as the processors 1312 and the peripherals interface 1310, may be controlled by the memory controller 1314.

The peripherals interface 1310 may couple the input and output peripherals of the FDA 100 to the processor(s) 1312 and memory 1316. The one or more processors 1312 run or execute various software programs and/or sets of instructions stored in memory 1316 to perform various functions for the FDA 100 and to process data. In some embodiments, processors 1312 may include general central processing units (CPUs), specialized processing units such as Graphical Processing Units (GPUs) particularly suited to parallel processing applications, or any combination thereof.

In some embodiments, the peripherals interface 1310, the processor(s) 1312, and the memory controller 1314 may be implemented on a single integrated chip. In some other embodiments, they may be implemented on separate chips.

The network communications interface 1322 may facilitate transmission and reception of communications signals often in the form of electromagnetic signals. The transmission and reception of electromagnetic communications signals may be carried out over physical media such copper wire cabling or fiber optic cabling, or may be carried out wirelessly for example, via a radiofrequency (RF) transceiver. In some embodiments the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, or any other suitable communication protocol, including communication protocols not yet developed as of the filing date of this document.

The audio circuitry 1324, including the speaker and microphone 1350 may provide an audio interface between the surrounding environment and the FDA 100. The audio circuitry 1324 may receive audio data from the peripherals interface 1310, convert the audio data to an electrical signal, and transmits the electrical signal to the speaker 1350. The speaker 1350 may convert the electrical signal to human-audible sound waves. The audio circuitry 1324 may also receive electrical signals converted by the microphone 1350 from sound waves. The audio circuitry 1324 may convert the electrical signal to audio data and transmits the audio data to the peripherals interface 1310 for processing. Audio data may be retrieved from and/or transmitted to memory 1316 and/or the network communications interface 1322 by the peripherals interface 1310.

The I/O subsystem 1360 may couple input/output peripherals on the FDA 100, such as an optical sensor system 1334, the PMD interface 1338, and other input/control devices 1342, to the peripherals interface 1310. The I/O subsystem 1360 may include an optical sensor controller 1332, a PMD interface controller 1336, and other input controller(s) 1340 for other input or control devices. The one or more input controllers 1340 receive/send electrical signals from/to other input or control devices 1342.

The other input/control devices 1342 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the FDA 100 and a user 102. A display controller may receive and/or send electrical signals from/to the touch screen. The touch screen may display visual output to the user 102. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 1316) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

The PMD interface device 1338 along with PMD interface controller 1336 may facilitate the transmission of data between the FDA 100 and a PMD 104 in use as a control device by a user 102. According to some embodiments, communications interface 1322 may facilitate the transmission of data between FDA 100 and a PMD 104 (for example where data is transferred over a local Wi-Fi network).

The FDA 100 also includes a power system 1318 for powering the various components. The power system 1318 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in computerized device.

The FDA 100 may also include one or more optical sensors 1334. FIG. 13 shows an optical sensor coupled to an optical sensor controller 1332 in I/O subsystem 1360. The optical sensor 1334 may include a charge-coupled device (CCD) or complementary metal-oxide semiconductor (CMOS) phototransistors. The optical sensor 1334 receives light from the environment, projected through one or more lens (the combination of optical sensor and lens herein referred to as a "camera") and converts the light to data representing an image. In conjunction with an imaging module located in memory 1316, the optical sensor 1332 may capture still images and/or video. In some embodiments, FDA 100 may include a single fixed camera. In other embodiments, FDA 100 may include a single adjustable camera (adjustable using a gimbal mechanism with one or more axis of motion). In some embodiments FDA 100 may include a single wide-angle lens providing a wider range of vision. In some embodiments FDA 100 may include a single omnidirectional camera providing full 360 degree viewing in all directions. In some embodiments FDA 100 may include two or more cameras (of any type as described herein) placed next to each other in order to provide stereoscopic vision. In some embodiments FDA 100 may include multiple cameras of any combination as described above. For example, FDA 100 may include four sets of two cameras each positioned such that FDA 100 may provide a stereoscopic view of the full 360 degrees about its perimeter. In some embodiments, an FDA 100 may include some cameras dedicated for image capture and other cameras dedicated for localization and navigation.

The FDA 100 may also include one or more proximity sensors 1330. FIG. 13 shows a proximity sensor 1330 coupled to the peripherals interface 1310. Alternately, the proximity sensor 1330 may be coupled to an input controller 1340 in the I/O subsystem 1360. Proximity sensors 1330 may generally include remote sensing technology for proximity detection, range measurement, target identification, etc. For example, proximity sensors 1330 may include radar, sonar, and light illuminated detection and ranging (Lidar).

The FDA 100 may also include one or more accelerometers 1326. FIG. 13 shows an accelerometer 1326 coupled to the peripherals interface 1310. Alternately, the accelerometer 1326 may be coupled to an input controller 1340 in the I/O subsystem 1360.

The FDA 100 may include one or more inertial measurement units (IMU) 1328. An IMU 1328 may measure and report the FDA's velocity, acceleration, orientation, and gravitational forces using a combination of gyroscopes and accelerometers (e.g., accelerometer 1326).

The FDA 100 may include a global positioning system (GPS) receiver 1320. FIG. 13 shows an GPS receiver 1320 coupled to the peripherals interface 1310. Alternately, the GPS receiver 1320 may be coupled to an input controller 1340 in the I/O subsystem 1360. The GPS receiver 1320 may receive signals from GPS satellites in orbit around the earth, calculate a distance to each of the GPS satellites (through the use of GPS software), and thereby pinpoint a current global position of FDA 100. In some embodiments, positioning of FDA 100 may be accomplished without GPS satellites through the use of other techniques as described herein.

In some embodiments, the software components stored in memory 1316 may include an operating system, a communication module (or set of instructions), a flight control module (or set of instructions), a localization module (or set of instructions), a computer vision module, a graphics module (or set of instructions), and other applications (or sets of instructions). For clarity one or more modules and/or applications may not be shown in FIG. 13.

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A communications module may facilitate communication with other devices over one or more external ports 1344 and may also include various software components for handling data transmission via the network communications interface 1322. The external port 1344 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including without limitation text, still images, videos, animations, icons (such as user-interface objects including soft keys), and the like. The graphics module in conjunction with a graphics processing unit (GPU) 1312 may process in real time or near real time, graphics data captured by optical sensor(s) 1334 and/or proximity sensors 1330.

A computer vision module, which may be a component of graphics module, provides analysis and recognition of graphics data. For example, while FDA 100 is in flight, the computer vision module along with graphics module (if separate), GPU 1312, and optical sensor(s) 1334 and/or proximity sensors 1330 may recognize and track the captured image of a subject located on the ground. The computer vision module may further communicate with a localization/navigation module and flight control module to update a relative position between FDA 100 and a point of reference, for example a target object (e.g., a PMD or human subject), and provide course corrections to maintain a constant relative position where the subject is in motion.

A localization/navigation module may determine the location and/or orientation of FDA 100 and provides this information for use in various modules and applications (e.g., to a flight control module in order to generate commands for use by the flight controller 1308).

Optical sensor(s) 1333 in conjunction with, optical sensor controller 1332, and a graphics module, may be used to capture still images or video (including a video stream) and store them into memory 1316.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 1316 may store a subset of the modules and data structures identified above. Furthermore, memory 1316 may store additional modules and data structures not described above.

Background on a Portable Multifunction Device

Figure 14:
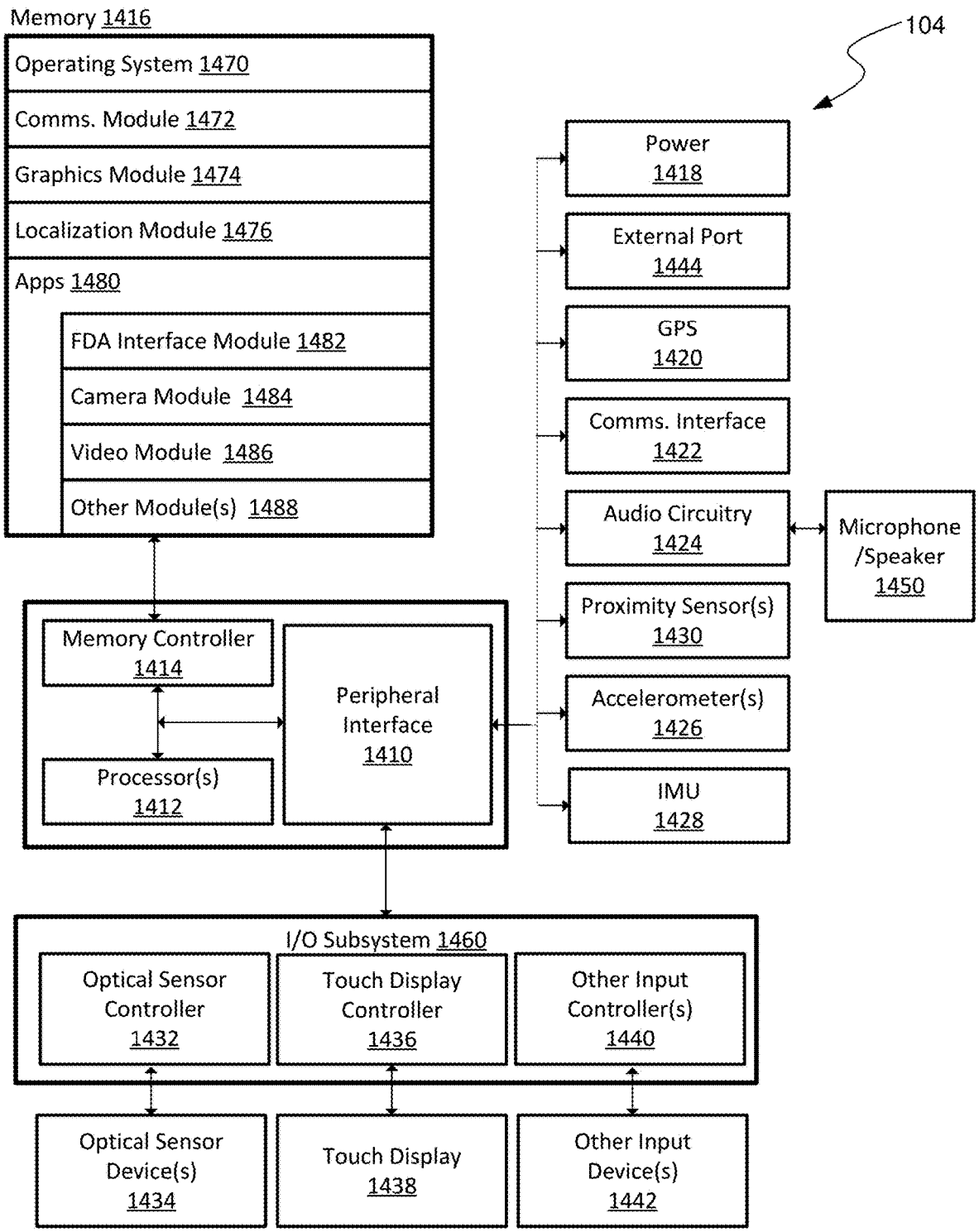
FIG. 14 is a system diagram of components in an example PMD, according to some embodiments.

FIG. 14 is a block diagram illustrating an example portable multifunction device ("PMD") 104 in accordance with some embodiments. In some embodiments, PMD 104 may include mobile, hand held or otherwise portable computing devices that may be any of, but not limited to, a notebook, a laptop computer, a handheld computer, a palmtop computer, a mobile phone, a cell phone, a PDA, a smart phone (e.g., iPhone®, etc.), a tablet (e.g., iPad®, etc.), a phablet (e.g., HTC Droid DNA™, etc.), a tablet PC, a thin-client, a hand held console, a hand held gaming device or console (e.g., XBOX®, etc.), mobile-enabled powered watch (e.g., iOS, Android or other platform based), a smart glass device (e.g., Google Glass™, etc.) and/or any other portable, mobile, hand held devices, etc. running on any platform or any operating system (e.g., OS X, iOS, Windows Mobile, Android, Blackberry OS, Embedded Linux platforms, Palm OS, Symbian platform, Google Chrome OS, etc.). A PMD 104 may also be a simple electronic device comprising minimal components. For example, a PMD may simply include sensors for detecting motion and/or orientation and a transmitter/receiver means for transmitting and/or receiving data. As an illustrative example, in the case of the magic wand interface, the PMD 104 may simply be proprietary electronic "wand" capable of detecting changes in position and orientation using onboard sensors and transmitting that sensor data to another computing device.

The PMD 104 may include a memory 1416 (which may include one or more computer readable storage mediums), a memory controller 1414, one or more processing units 1412 which may include central processing units (CPUs) and graphics processing units (GPUs), a peripherals interface 1410, network communications interface 1422, audio interface 1424, a speaker/microphone 1450, power systems 1418, external port(s) 1444, GPS system 1420, proximity sensors 1430, accelerometers 1426, inertial measurement unit (IMU) 1428, and an input/output (I/O) subsystem 1460. The PMD 104 may include one or more optical sensors 1434. These components may communicate over one or more communication buses or signal lines.

PMD 104 is only one example of a PMD. PMD 104 may have more or fewer components than shown, may combine two or more components, or a may have a different configuration or arrangement of the components. The various components shown in FIG. 14 may be implemented in hardware, software or a combination of both hardware and software, including one or more signal processing and/or application specific integrated circuits. Further, general terms such as "sensors" may refer to one or more components or combinations of components, for example, microphone 1424, proximity sensors 1430, accelerometers 1426, IMU 1428, optical sensors 1434, and any combination thereof.

Memory 1416 may include high-speed random-access memory and may also include non-volatile memory, such as one or more magnetic disk storage devices, flash memory devices, or other non-volatile solid-state memory devices. Access to memory 1416 by other components of PMD 104, such as the processor(s) 1412 and the peripherals interface 1410, may be controlled by the memory controller 1414.

The peripherals interface 1410 couples the input and output peripherals of the device to the processor(s) 1412 and memory 1416. One or more processors 1412 may run or execute various software programs and/or sets of instructions stored in memory 1416 to perform various functions for the PMD 104 and to process data.

In some embodiments, the peripherals interface 1410, the processor(s) 1412, and the memory controller 1414 may be implemented on a single chip, such as an integrated microchip. In some other embodiments, they may be implemented on separate chips.

The network communications interface 1422 may facilitate transmission and reception of communications signals often in the form of electromagnetic signals. The transmission and reception of electromagnetic communications signals may be carried out over physical media such copper wire cabling or fiber optic cabling, or may be carried out wirelessly for example, via a radiofrequency (RF) transceiver. In some embodiments the network communications interface 1422 may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, or any other suitable communication protocol, including communication protocols not yet developed as of the filing date of this document.

The audio circuitry 1424, the speaker/microphone 1450 may provide an audio interface between a user 102 and the PMD 104. The audio circuitry 1424 may receive audio data from the peripherals interface 1410, convert the audio data to an electrical signal, and transmit the electrical signal to the speaker 1450. The speaker 1450 may convert the electrical signal to human-audible sound waves. The audio circuitry 1424 may also receive electrical signals converted by the microphone 1450 from sound waves. The audio circuitry 1424 converts the electrical signal to audio data and transmits the audio data to the peripherals interface 1410 for processing. Audio data may be retrieved from and/or transmitted to memory 1416 and/or the network communications interface 1422 by the peripherals interface 1410.

The I/O subsystem 1460 couples input/output peripherals on the PMD 104, such as a touch sensitive display system 1436-1438 and other input/control devices 1440, to the peripherals interface 1410. The I/O subsystem 1460 may include an optical sensor controller 1432 for one or more optical sensor devices 1434, a display controller 1436 for one or more touch displays 1438, and one or more other input controllers 1440 for other input or control devices 1442. The one or more input controllers 1440 receive/send electrical signals from/to other input or control devices 1442. The other input/control devices 1442 may include physical buttons (e.g., push buttons, rocker buttons, etc.), dials, slider switches, joysticks, click wheels, and so forth. The touch screen 1438 is used to implement virtual or soft buttons and one or more soft keyboards.

The touch-sensitive touch screen 1438 provides an input interface and an output interface between the PMD 104 and a user 102. The display controller 1436 receives and/or sends electrical signals from/to the touch screen 1438. The touch screen 1438 displays visual output to the user 102. The visual output may include graphics, text, icons, video, and any combination thereof (collectively termed "graphics"). In some embodiments, some or all of the visual output may correspond to user-interface objects, further details of which are described below.

A touch sensitive display system 1438 may have a touch-sensitive surface, sensor or set of sensors that accepts input from the user based on haptic and/or tactile contact. The touch sensitive display system 1438 and the display controller 1436 (along with any associated modules and/or sets of instructions in memory 1416) detect contact (and any movement or breaking of the contact) on the touch screen 1438 and converts the detected contact into interaction with user-interface objects (e.g., one or more soft keys, icons, web pages or images) that are displayed on the touch screen. In an exemplary embodiment, a point of contact between a touch screen 1438 and the user corresponds to a finger of the user 102.

The touch screen 1438 may use LCD (liquid crystal display) technology, or LPD (light emitting polymer display) technology, although other display technologies may be used in other embodiments. The touch screen 1438 and the display controller 1436 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1438.

The PMD 104 also includes a power system 1418 for powering the various components. The power system 1418 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The PMD 104 may also include one or more optical sensors 1434. FIG. 13 shows an optical sensor coupled to an optical sensor controller 1432 in I/O subsystem 1460. The optical sensor 1343 may be directly coupled to the peripheral interface 1410. The optical sensor device 1434 may include charge-coupled device (CCD) or complementary metal-oxide semiconductor (CMOS) phototransistors. The optical sensor 1434 receives light from the environment, projected through one or more lens, and converts the light to data representing an image. In conjunction with an imaging module 1484 (also called a camera module), the optical sensor 1434 may capture still images and/or video. In some embodiments, an optical sensor is located on the back of the PMD 104, opposite the touch screen display 1438 on the front of the device, so that the touch screen display may be used as a viewfinder for either still and/or video image acquisition. In some embodiments, an optical sensor 134 is located on the front of the device. In some embodiments, the position of the optical sensor 1434 can be changed by the user 102 (e.g., by rotating the lens and the sensor in the device housing) so that a single optical sensor 1434 may be used along with the touch screen display.

Optical sensors 1434 in conjunction with accelerometers 1426, IMU 1428 and a localization module may facilitate calculating estimates of the position and/or orientation of PMD 104, for example via a process of visual odometry.

The PMD 104 may also include one or more proximity sensors 1430. FIG. 14 shows a proximity sensor 1430 coupled to the peripherals interface 1410. Alternately, the proximity sensor 1430 may be coupled to an input controller 1440 in the I/O subsystem 1460. Proximity sensors 1430 may generally include remote sensing technology for proximity detection, range measurement, target identification, etc.

The PMD 104 may also include one or more accelerometers 1426. FIG. 14 shows an accelerometer 1426 coupled to the peripherals interface 1410. Alternately, the accelerometer 1426 may be coupled to an input controller 1440 in the I/O subsystem 1460.

The PMD 104 may include one or more inertial measurement units (IMU) 1428. An IMU 1428 may measure and report the PMD's velocity, acceleration, orientation, and gravitational forces using a combination of gyroscopes and accelerometers (e.g., accelerometer 1426).

The PMD 104 may also include a global positioning system (GPS) receiver 1420. FIG. 14 shows a GPS receiver 1420 coupled to the peripherals interface 1410. Alternately, the GPS receiver 1420 may be coupled to an input controller 1440 in the I/O subsystem 1460. The GPS receiver 1420 may receive signals from GPS satellites in orbit around the earth, calculate a distance to each of the GPS satellites (through the use of GPS software, e.g., GPS module 1476), and thereby pinpoint a current global position of a PMD 104. In some embodiments, global positioning of the PMD 104 may be accomplished without GPS satellites through the use of similar techniques applied to cellular and/or Wi-Fi signals received from cellular and/or Wi-Fi antennae.

In some embodiments, the software components stored in memory 1416 may include an operating system 1470, a communication module (or set of instructions) 1472, a contact/motion module (or set of instructions), a graphics module (or set of instructions) 1474, a text input module (or set of instructions), a Global Positioning System (GPS) module (or set of instructions) 1476, and various applications (or sets of instructions) 1480.

The operating system 1470 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1472 facilitates communication with other devices over one or more external ports 1444 and/or via network communications interface 1422. The external port 1444 (e.g., Universal Serial Bus (USB), FIRE-WIRE, etc.) may be adapted for coupling directly to other devices or indirectly over a network (e.g., the Internet, wireless LAN, etc.).

A contact/motion module may detect contact with the touch screen 1438 (in conjunction with the display controller 1436) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen 1438, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller 1436 also detect contact on a touchpad.

The graphics module 1474 includes various known software components for rendering and displaying graphics on the touch screen 1438, including components for changing the intensity of graphics that are displayed. As used herein, the term "graphics" includes any object that can be displayed to a user, which may include, but not be limited by, text, web pages, icons (such as user-interface objects including soft keys), digital images, videos, animations and the like.

The localization module 1476 may determine the location and/or orientation of the device based on sensor data received from components such as, but not limited to, IMU 1428, accelerometer(s) 1426, proximity sensors 1430 and optical sensors 1434. Position and/or orientation information may be provided for use in various applications (e.g., to the FDA interface module 1482).

The applications 1480 may include the following modules (or sets of instructions), or a subset or superset thereof:

An FDA interface module 1482 for interfacing with an FDA 100. For example, FDA interface module 1480 may be an app that allows a user 102 to control the flight and image capture by an FDA 100 via the PMD 104 and perform any of the other methodologies disclosed in this specification.

a camera module 1484 for the capture and analysis of still and/or video images;

a video player module 1486 for playing back images/videos captured by an FDA; and any other apps or modules 1488;

In conjunction with touch screen 1438, display controller 1436, graphics module 1474, communications interface 1422, and IMU 1428, the FDA interface module 1482 may display to the user 102 a user interface to control the flight and image capture by an associated FDA 100. In some embodiments, FDA interface module may include image video editing tools to perform some of the processes described herein. In some embodiments, the FDA interface module in conjunction with a graphics module 1474 and GPU 1412, may facilitate the real time generating and rendering of 3D models of surrounding areas based on sensor data received via an FDA 100 and/or the PMD 104. In some embodiments, the real time generating and rendering may be performed by processors at a PMD 104, by processors at an FDA 100, and/or by processors at other remote computing devices.

In conjunction with touch screen 1438, display controller 1436, optical sensor(s) 1434, optical sensor controller 1432, graphics module 1475, and an image management module, the camera module 1484 may be used to capture still images or video (including a video stream) and store these in memory 1416, to modify characteristics of a still image or video, or to delete a still image or video from memory 1416.

In conjunction with a touch screen 1438, a display controller 1436, a graphics module 1474, a camera module 1484, an image management module (not shown) may be used to arrange, modify or otherwise manipulate, label, delete, present (e.g., in a digital slide show or album), and store still and/or video images.

In conjunction with the touch screen 1438, the display controller 1436, the graphics module 1474, the audio circuitry 1424, and the speaker 1450, the video player module 1486 may be used to display, present or otherwise play back videos (e.g., on the touch screen or on an external, connected display via external port 1444). Embodiments of user interfaces and associated processes using video player module 1486 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 1416 may store a subset of the modules and data structures identified above. Furthermore, memory 1416 may store additional modules and data structures not described above.

REMARKS AND DISCLAIMERS

The disclosed description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method for controlling an unmanned aerial vehicle (UAV), the method comprising:
defining, by a processing system, a virtual line extending from a mobile device to the UAV; and
causing the UAV to autonomously maneuver towards a point along the virtual line.

2. The method of claim 1, further comprising:
receiving an input indicating an intent to control the UAV.

3. The method of claim 2, further comprising:
responsive to the input, causing the UAV to maintain its current distance relative to a reference point.

4. The method of claim 3, further comprising:
responsive to the input, causing the UAV to maintain its current position and/or orientation relative to the reference point.

5. The method of claim 4, wherein the reference point comprises a location of the mobile device in the physical environment.

6. The method of claim 2, further comprising:
responsive to the input, causing the UAV to autonomously maneuver to a pre-defined position and/or orientation relative to a reference point.

7. The method of claim 6, further comprising:
tracking, by the processing system, a location of the mobile device in the physical environment;
wherein the reference point comprises the location of the mobile device.

8. The method of claim 6, wherein the reference point is at or associated with a physical object in physical space.

9. The method of claim 1, further comprising:
receiving an input indicating an intent to adjust a distance between the UAV and a reference point while maintaining a same angle of elevation.

10. The method of claim 9, wherein the input is received via a touch screen of the mobile device.

11. The method of claim 10, wherein the adjustment to the distance between the UAV and the reference point can be manipulated via a slider bar on the touch screen.

12. A system for controlling an unmanned aerial vehicle (UAV), the system comprising:
a display;
one or more processors; and
one or more memory units having instructions stored thereon which, when executed by the one or more processors, cause the system to:
define a virtual line extending from the system to the UAV; and
generate control commands configured to cause the UAV to autonomously maneuver towards a point along the virtual line; and
transmit the control commands to the UAV.

13. The system of claim 12, further comprising:
an input mechanism configured to receive an input indicating an intent to control the UAV.

14. The system of claim 13, wherein the instructions, when executed by the one or more processors, further cause the system to:
responsive to the input, generate instructions configured to cause the UAV to maintain its current distance relative to a reference point; and
transmit the instructions to the UAV.

15. The system of claim 13, wherein the instructions, when executed by the one or more processors, further cause the system to:
responsive to the input, generate instructions configured to cause the UAV to maintain its current position and/or orientation relative to the reference point; and
transmit the instructions to the UAV.

16. The system of claim 13, wherein the instructions, when executed by the one or more processors, further cause the system to:
responsive to the input, generate instructions configured to cause the UAV to autonomously maneuver to a pre-defined position and/or orientation relative to a reference point; and
transmit the instructions to the UAV.

17. The system of claim 13, wherein the input mechanism is further configured to receive an input indicating an intent to adjust a distance between the UAV and a reference point while maintaining a same angle of elevation.

18. The system of claim 17, wherein the input mechanism comprises a touch screen.

19. The system of claim 18, wherein the adjustment to the distance between the UAV and the reference point is manipulated via a slider bar presented on the touch screen.

20. An unmanned aerial vehicle (UAV) configured for autonomous flight through a physical environment, the UAV comprising:
a first image capture device configured to capture images of the physical environment;
a propulsion system configured to maneuver the UAV through the physical environment;
a processing system; and an autonomous navigation system configured to:
  define a virtual line extending from a mobile device to the UAV; and
  cause the propulsion system to autonomously maneuver the UAV towards a point along the virtual line.

* * * * *